(12) United States Patent  (10) Patent No.: US 12,230,798 B2
Shin et al.  (45) Date of Patent: Feb. 18, 2025

(54) COMPOSITIONS AND METHODS FOR SILICON CONTAINING DRY ANODE FILMS

(71) Applicant: Tesla, Inc., Austin, TX (US)

(72) Inventors: Joon Ho Shin, San Diego, CA (US); Haim Feigenbaum, Irvine, CA (US); Hieu Minh Duong, Rosemead, CA (US)

(73) Assignee: Tesla, Inc., Austin, TX (US)

( * ) Notice: Subject to any disclaimer, the term of this patent is extended or adjusted under 35 U.S.C. 154(b) by 1088 days.

(21) Appl. No.: 17/048,974

(22) PCT Filed: Apr. 30, 2019

(86) PCT No.: PCT/US2019/029898
§ 371 (c)(1),
(2) Date: Oct. 19, 2020

(87) PCT Pub. No.: WO2019/213068
PCT Pub. Date: Nov. 7, 2019

(65) Prior Publication Data
US 2021/0249657 A1  Aug. 12, 2021

Related U.S. Application Data

(60) Provisional application No. 62/666,037, filed on May 2, 2018.

(51) Int. Cl.
H01M 4/583 (2010.01)
H01M 4/04 (2006.01)
(Continued)

(52) U.S. Cl.
CPC ......... *H01M 4/583* (2013.01); *H01M 4/0435* (2013.01); *H01M 4/366* (2013.01); (Continued)

(58) Field of Classification Search
CPC .... H01M 4/583; H01M 4/0435; H01M 4/366; H01M 4/386; H01M 4/623; H01M 10/0525; H01M 2004/021
See application file for complete search history.

(56) References Cited

U.S. PATENT DOCUMENTS 7,935,155 B2  5/2011 Porter et al.
9,525,168 B2  12/2016 Porter et al.
(Continued)

FOREIGN PATENT DOCUMENTS

GB  2551369  12/2017
JP  07-235293  9/1995
(Continued)

OTHER PUBLICATIONS

KR20170048210A translation (Year: 2017).*
(Continued)

*Primary Examiner* — Jane J Rhee
(74) *Attorney, Agent, or Firm* — Knobbe, Martens, Olson & Bear, LLP

(57) ABSTRACT

Dry process electrode films, and energy storage devices incorporating the same are described, including a silicon active material. The films may be free standing anode electrode films. Also provided are methods for fabricating such anode electrode films.

24 Claims, 16 Drawing Sheets

(51) Int. Cl.
   *H01M 4/36*      (2006.01)
   *H01M 4/38*      (2006.01)
   *H01M 4/62*      (2006.01)
   *H01M 10/0525*   (2010.01)
   *H01M 4/02*      (2006.01)

(52) U.S. Cl.
   CPC ........... *H01M 4/386* (2013.01); *H01M 4/623* (2013.01); *H01M 10/0525* (2013.01); *H01M 2004/021* (2013.01)

(56) References Cited

U.S. PATENT DOCUMENTS

| | | | |
|---|---|---|---|
| 2006/0114643 | A1 | 6/2006 | Porter et al. |
| 2006/0133013 | A1 | 6/2006 | Xi et al. |
| 2007/0122698 | A1 | 5/2007 | Porter et al. |
| 2015/0194698 | A1 | 7/2015 | Youm |
| 2015/0303481 | A1* | 10/2015 | Duong .................. H01M 4/623 241/5 |
| 2017/0346079 | A1* | 11/2017 | Friend .................. H01M 4/587 |
| 2018/0062155 | A1 | 3/2018 | Porter et al. |
| 2019/0036119 | A1 | 1/2019 | Lee et al. |

FOREIGN PATENT DOCUMENTS

| | | |
|---|---|---|
| JP | 10-270086 | 10/1998 |
| JP | 2004-362789 | 12/2004 |
| JP | 2005-327282 | 11/2005 |
| JP | 2006-164960 | 6/2006 |
| JP | 2007-134108 | 5/2007 |
| WO | WO 16/210419 | 12/2016 |
| WO | WO 17/150311 | 9/2017 |
| WO | WO 18/156518 | 8/2018 |

OTHER PUBLICATIONS

International Search Report and Written Opinion dated Jul. 12, 2019 in application No. PCT/US2019/029898.

Masafumi Arakawa, Jun. 10, 1980, Introduction to Particle Size Measurement, Journal of the Society of Powder Technology, Japan, 17(6):299-307.

Wood et al., Aug. 29, 2017, Technical and economic analysis of solvent-based lithium-ion electrode drying with water and NMP, Drying Technology, 36(2):1-11.

* cited by examiner

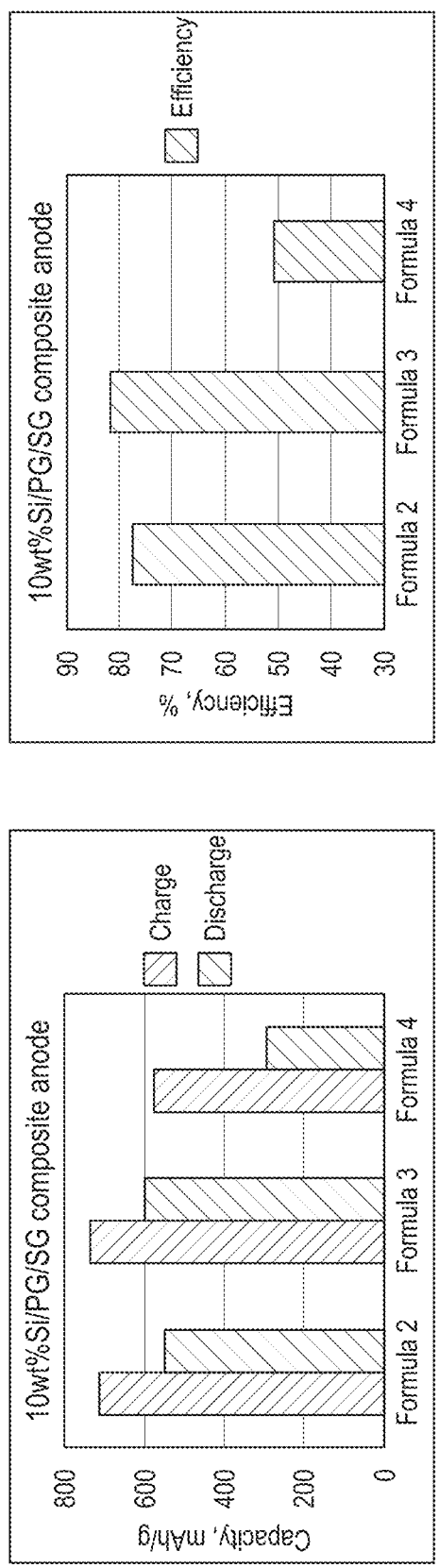
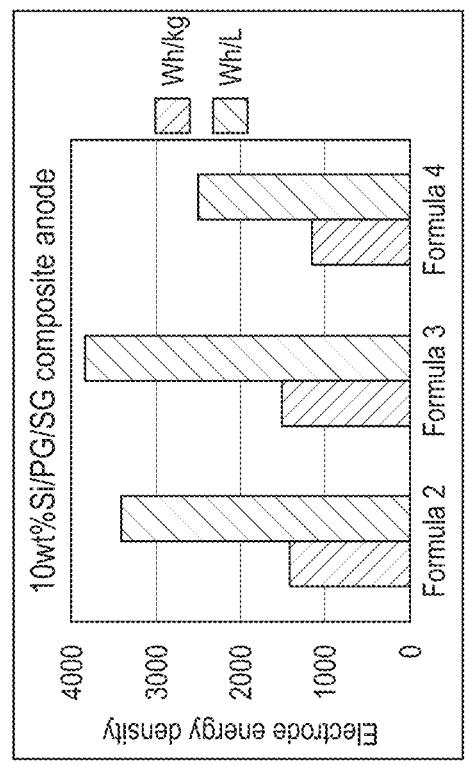
FIG. 6B
FIG. 6C
FIG. 6A

COMPOSITIONS AND METHODS FOR SILICON CONTAINING DRY ANODE FILMS

INCORPORATION BY REFERENCE TO ANY PRIORITY APPLICATIONS

This application claims the benefit of priority to U.S. provisional Patent Application No. 62/666,037, filed May 2, 2018 and titled "COMPOSITIONS AND METHODS FOR SILICON CONTAINING DRY ANODE FILMS", which is incorporated by reference herein in its entirety for all purposes.

BACKGROUND

Field of the Invention

The present invention relates generally to energy storage devices, and specifically to materials and methods for dry electrode films including silicon-based active materials.

Description of the Related Art

Electrical energy storage cells are widely used to provide power to electronic, electromechanical, electrochemical, and other useful devices. Such cells include batteries such as primary chemical cells and secondary (rechargeable) cells, fuel cells, and various species of capacitors, including ultracapacitors. Increasing the operating power and energy of energy storage devices, including capacitors and batteries, would be desirable for enhancing energy storage, increasing power capability, and broadening real-world use cases.

Energy storage devices including electrode films combining complimentary attributes may increase energy storage device performance in real-world applications. Furthermore, existing dry and solvent-free methods of fabrication may impose a practical limit to the composition of an electrode. Thus, new electrode film formulations, and methods for their fabrication, may result in expanded possibilities for electrode film formulation, and consequently in improved performance.

SUMMARY

For purposes of summarizing the invention and the advantages achieved over the prior art, certain objects and advantages of the invention are described herein. Not all such objects or advantages may be achieved in any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

One embodiment is a silicon-based lithium battery anode that comprises two different graphite particle sizes and is made through a non-solvent based dry process. In the anode, a primary graphite may have an average (i.e. $D_{50}$) particle size of approximately 20-30 µm and secondary graphite may have an average particle size of approximately 4-7 µm. The silicon component of the anode may comprise pristine silicon, silicon oxide, prelithiated silicon and silicon-carbon composite. In one embodiment, the silicon component constitutes approximately 10 wt % to 30 wt % of the total mass of the electrode formulation. The dry binder within the anode may comprise carboxylmethyl cellulose, polyethylene oxide, polyacrylic acid, polyvinylidene fluoride, polytetrafluoroethylene and combinations thereof. In one embodiment the dry binder is included at approximately 4 wt % to 10 wt % of the total mass of the anode formulation.

In a first aspect, a self-supporting dry anode electrode film including a silicon active material is provided.

In a second aspect, dry electrode film of an energy storage device is provided. The dry electrode film includes a dry active material comprising a Group 14 active material and a graphite active material, and a dry binder, wherein the dry electrode film is free-standing.

In a third aspect, a method of fabricating a dry electrode film of an energy storage device is provided. The method includes mixing a dry Group 14 active material with a dry graphite material to form a dry active material mixture, mixing the dry active material mixture with a dry binder to form a dry electrode film mixture, and calendering the dry electrode film mixture to form a free-standing dry electrode film.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

FIGS. 6A-6C provide bar charts showing electrochemical charge and discharge capacities (FIG. 6A), coulombic efficiencies (FIG. 6B), and electrode energy densities (FIG. 6C) of Si/PG/SG composite dry electrode half cells including 10 wt % Si for embodiments according to Formulas 2, 3, and 4 of Table 1, according to Example 4.

DETAILED DESCRIPTION

Figure 1:
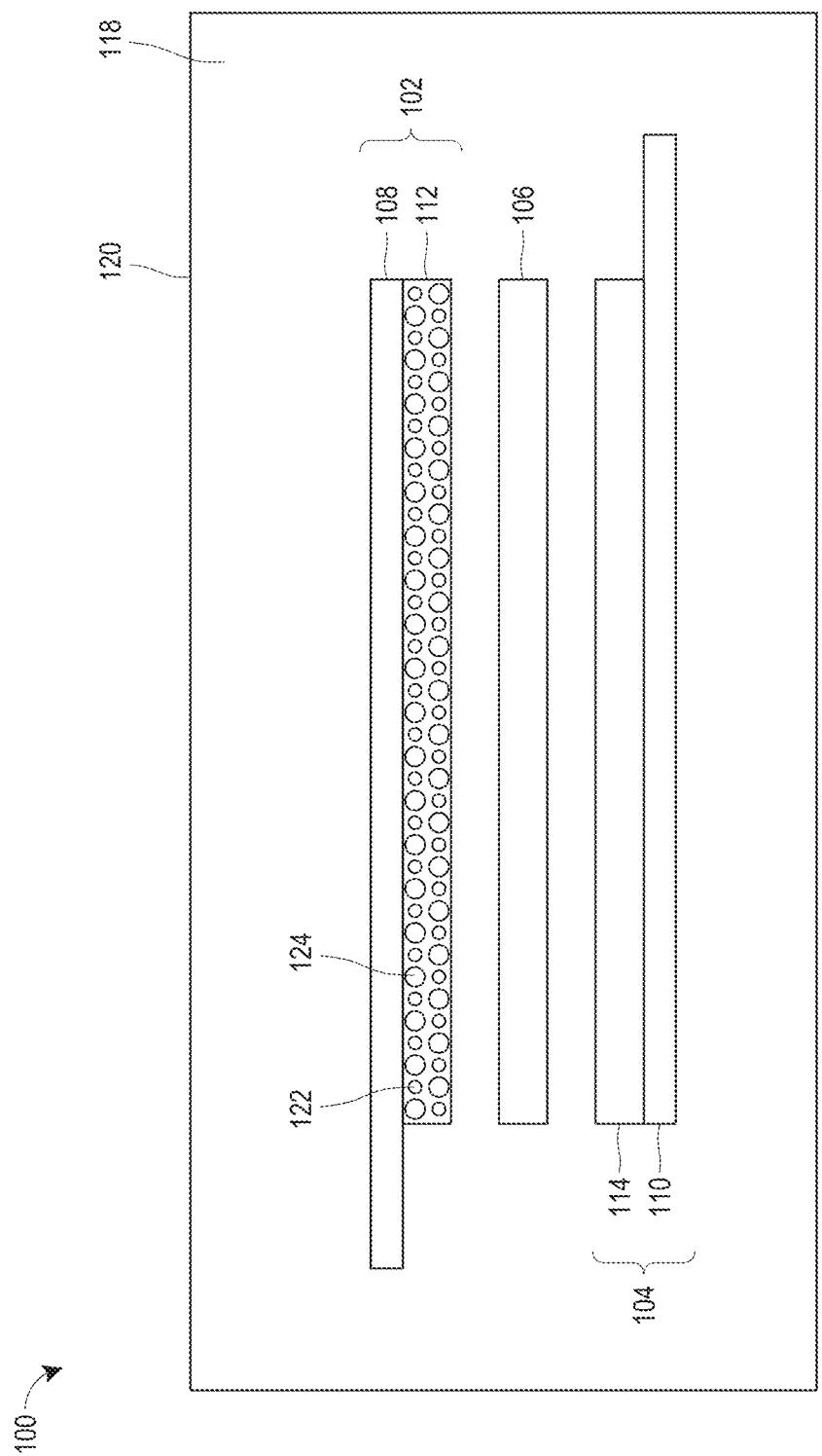
FIG. 1 depicts an embodiment of an energy storage device comprising a silicon-based electrode film.

Various embodiments of electrode films for use in energy storage devices are described. In particular, in certain embodiments, energy storage devices disclosed herein include anode electrode films including silicon materials. The electrode films exhibit improved mechanical and processing characteristics than typical silicon-containing electrode films. Also provided are methods for fabricating such electrode films. The present disclosure reveals that materials in electrode films can be realized when the particle sizes of certain components are within the ranges provided herein.

Lithium ion batteries have been relied on as a power source in numerous commercial and industrial uses, for example, in consumer devices, productivity devices, and in battery powered vehicles. However, demands placed on energy storage devices are continuously—and rapidly—growing. For example, the automotive industry is developing vehicles that rely on compact and efficient energy storage, such as plug-in hybrid vehicles and pure electric vehicles.

Group 14 metalloids and metals, for example, tin and silicon, are known as high energy active materials that may desirably be included in energy storage device anodes. It is thought that one silicon atom can accommodate 4.4 equivalents of lithium ions. Theoretically, the material formed may be $Li_{4.4}Si$. Therefore, in principle, silicon anode materials might store approximately 11 times more capacity (4200 mAh/g and 9782 mAh/L) than graphite (372 mAh/g). Silicon has been described as a high capacity anode material. Tin is another Group 14 element demonstrated herein as an anode active material.

However, some characteristics of Group 14 metalloids and metals, in particular silicon, present challenges in implementation in real-world devices. Notably, silicon is believed to undergo relatively large volumetric changes during lithiation and delithiation. Such changes may lead to loss of cohesiveness and/or adhesiveness of an electrode film upon cycling, which may result in high contact resistance within an electrode, and may eventually contribute to cell failure. Furthermore, silicon has typically been incorporated in electrodes as nanoparticles. Such nanoparticles require larger amounts of binder in order to maintain film integrity—up to 30 weight % binder may be needed. Additionally, in a wet fabrication process, greater amounts of solvent are needed to suspend the nanoparticles. Thus, incorporating silicon, which is desired to yield improvements in electrode film capacity, may deteriorate the stability and processability of an electrode film. Thus, there is a need for silicon containing electrode films that maintain cycleability, and are compatible with industrial processing techniques.

Silicon materials may include nanoparticles, nanowire and silicon/graphene composites. Silicon nanoparticle and nanowire anodes are expected to benefit from a fairy high binder loading (~30 wt %) and solvent in a wet electrode coating process because of the high surface area of these materials. One approach for the use of silicon in anodes is to combine silicon and graphite to form a silicon/graphite composite. However, the content of silicon in a silicon/graphite composite may be limited due to the nature of the materials, such as volume expansion and achieving a uniform dispersion of silicon, that may be expected to impact the electrochemical performance of silicon/graphite composite electrodes.

One embodiment includes electrode films that are fabricated including various electrode materials, for example, graphite, silicon, silicon oxide, silicon-graphene, silicon-aluminum alloy, tin/graphene, and various polymer binders. Group 14 active materials, including silicon active materials, along with graphite in an anode were found to provide an anode electrode film that is processable while providing increased energy storage capacity. One embodiment is a silicon-containing anode electrode film that includes a first graphite material having particle sizes of more than about 10 μm, and a second graphite material having particles sizes of less than about 10 μm.

The materials and methods described herein may offer an advantage at higher Si content in a composite anode electrode film, and may provide high energy density electrodes. A dry anode electrode film including a silicon/graphite composite anode active material as described herein may deliver electrochemical charge capacity comparable to its theoretical charge capacity. Thus, the silicon active materials in a dry silicon/graphite composite anode electrode film may be electrochemically active and accessible over a charge/discharge cycle.

Definitions

The terms "battery" and "capacitor" are to be given their ordinary and customary meanings to a person of ordinary skill in the art. The terms "battery" and "capacitor" are nonexclusive of each other. A capacitor or battery can refer to a single electrochemical cell that may be operated alone, or operated as a component of a multi-cell system.

The voltage of an energy storage device is the operating voltage for a single battery or capacitor cell. Voltage may exceed the rated voltage or be below the rated voltage under load, or according to manufacturing tolerances.

The term "self-supporting" electrode film is an electrode film that incorporates binder matrix structures sufficient to support the film or layer and maintain its shape such that the electrode film or layer can be free-standing. When incorporated in an energy storage device, a self-supporting electrode film or active layer is one that incorporates such binder matrix structures. Generally, and depending on the methods employed, such electrode films are strong enough to be employed in energy storage device fabrication processes without any outside supporting elements, such as a current collector or other film. For example, a "self-supporting" electrode film can have sufficient strength to be rolled, handled, and unrolled within an electrode fabrication process without other supporting elements. A dry electrode film, such as a cathode electrode film or an anode electrode film, may be self-supporting.

A "solvent-free" electrode film is an electrode film that contains no detectable processing solvents, processing solvent residues, or processing solvent impurities. A dry electrode film, such as a cathode electrode film or an anode electrode film, may be solvent-free.

A "wet" electrode, "wet process" electrode, or slurry electrode, is an electrode prepared by at least one step involving a slurry of active material(s), binder(s), and optionally additive(s). A wet electrode may include processing solvents, processing solvent residues, and/or processing solvent impurities.

A "nondestructive" process is a process in which an electrode active material, including the surface of the electrode active material, is not substantially modified during the process. Thus, the analytical characteristics and/or performance in an application, such as incorporation in an energy storage device, of the active material, are identical or nearly identical to those which have not undergone the process. For example, a coating on the active material may be undisturbed or substantially undisturbed during the process. A non-limiting example of a nondestructive process is "non-destructively mixing or blending," or jet milling at a reduced pressure, increased feed rate, decreased velocity (e.g., blender speed), and/or change in other process parameter(s) such that the shear imparted upon an active material remains below a threshold at which the analytical characteristics and/or performance of the active material would be adversely affected, when implemented into an energy storage device. A "nondestructive" process can be distinguished from a high shear process which substantially modifies an electrode active material, such as the surface of an electrode active material, and substantially affects the analytical characteristics and/or the performance of the active material. For example, high shear blending or high shear jet milling can have detrimental effects on the surface of an electrode active material. A high shear process may be implemented, at the detriment to the active material surface characteristics, to provide other benefits, such as fibrillization of binder material, or otherwise forming a binder/active material matrix to assist in forming a self-supporting electrode film. Embodiments herein may provide similar benefits, while avoiding the detrimental effects of excessive use of high shear processes. In general, the nondestructive processes herein are performed at one or more of a higher feed rate, lower velocity, and/or lower pressure, resulting in a lower shear process than the more destructive processes that will otherwise substantially modify an electrode active material, and thus affect performance.

Silicon Containing Self Supporting Anode Electrode Films

Through the optimization of shape and size of electrode materials and variation of material compositions in electrode formulations, energy dense silicon- and/or tin-containing electrodes can be fabricated by a dry processing method. The graphite materials may be comprised of artificial graphite, for example, synthetic graphite, natural graphite, and blends of graphite. Generally, the graphite materials may vary in characteristics such as weight ratio, particle size, particle shape and raw materials origin.

One embodiment is a free standing and/or self-supporting silicon/graphite composite dry film with high silicon content. The dry film may be produced by using graphite of two different sizes. The primary graphite may be about 20-30 μm in particle size, while the secondary graphite material has a smaller particles size, for example, with a particle size in the range of 4-7 microns. Using the differing sized graphite was found to allow for the use of a relatively high silicon content at up to 10% to 30 wt % and to produce a strong flexible thin dry films with roll-to-roll electrode processability.

In some embodiments, an anode electrode film as provided herein includes at least one active material and at least one binder. The at least one active material generally includes a Group 14 active material, for example, a silicon active material and/or a tin active material, and at least one carbon based material, for example such as a graphite material.

One embodiment is a method of making a self-supporting anode electrode film containing silicon that is produced when a plurality of graphite materials having differing particle sizes are included. Graphite materials may be distinguishable according to the origin, for example natural or artificial graphite, surface characteristics, particle size, surface area, and/or particle shape. In some embodiments, at least one primary graphite (PG) and at least one secondary graphite (SG) are included in an anode electrode film.

The at least one primary graphite and the at least one secondary graphite may be distinguishable as having two different particle sizes. In some embodiments, at least one primary graphite having a first average particle size (i.e. $D_{50}$), and at least one secondary graphite having a second, smaller average particle size, are included in a silicon-containing electrode film. The at least one primary graphite may be an artificial or a natural graphite with an average particle size larger than about 10 μm. The at least one secondary graphite may be an artificial or a natural graphite with an average particle size smaller than 10 μm. In some embodiments, the at least one primary graphite has an average particle size of about 10 μm, about 15 μm, about 20 μm, about 25 μm, about 30 μm, about 35 μm, or about 40 μm, or any range of values therebetween. In further embodiments, the at least one secondary graphite has an average particle size of about 1 μm, about 2 μm, about 3 μm, about 4 μm, about 5 μm, about 6 μm, about 7 μm, about 8 μm, about 9 μm, or about 10 μm, or any range of values therebetween. In a certain embodiment, the at least one primary graphite has an average particle size of about 22-30 μm and the at least one secondary graphite has an average particle size of about 4-7 μm. In further embodiments, an anode electrode film includes a first primary graphite and a second primary graphite in combination with the secondary graphite as described above. In further embodiments, an anode electrode film includes a first secondary graphite and a second secondary graphite in combination with the primary graphite as described above. In further embodiments, an anode electrode film further includes a third primary graphite and/or a third secondary graphite.

An anode electrode film may comprise the primary graphite (PG) and secondary graphite (SG) at various weight ratios, for example, 10:1 to 1:10 PG:SG. In various embodiments, the PG:SG weight ratio may be, for example, about 10:1, about 8:1, about 6:1, about 5:1, about 4:1, about 3:1, about 2:1, about 1:1, about 1:2, about 1:3, about 1:4, about 1:5, about 1:6, about 1:8, or about 1:10, or any range of values therebetween.

Each of the at least one primary graphite and/or at least one secondary graphite may be a natural or artificial graphite. Each of the at least one primary graphite and/or at least one secondary graphite may be characterized by a particle shape, for example, spheroid, flaky, obloid, or irregular shapes. Each of the primary graphite and/or secondary graphite may include a surface coating. In some embodiments, the at least one primary graphite comprises a natural graphite or a synthetic graphite. In further embodiments, the at least one secondary graphite comprises a natural graphite or a synthetic graphite.

The anode electrode film generally comprises an anode active material. The anode active material may include at least one primary graphite, at least one secondary graphite, and a Group 14 active material, for example, a silicon active material or a tin active material. The silicon active material in the anode electrode film may comprise pristine silicon, silicon oxide, prelithiated silicon or silicon-carbon composite. The silicon active material may be selected from pure silicon (Si), silicon oxide (SiO), a silicon alloy, for example, Si—Al or Si—Sn. The silicon active material may include a silicon-carbon composite. The silicon-carbon composite may be, for example, a silicon graphene (SiC), a silicon graphite (Si/C), a silicon oxide graphene (SiOC), a silicon oxide graphite (SiO/C), a prelithiated silicon graphite and prelithiated silicon graphene. In some embodiments, the prelithiated silicon graphite may be a prelithiated silicon oxide graphite composite. The silicon active material may be SiH. The silicon active material may be a prelithiated silicon. The prelithiated silicon may be incorporated into the electrode film as $Li_xSiO_y$ or $Li_xSi_y$. The particle size of the silicon active material may be from nanoscale, i.e., about 1 nm to about 1000 nm, to microscale, i.e., about 1 μm to about 1000 μm. The silicon active material may comprise particles with a primary particle size of about 30 nm to about 10 μm. The silicon active material may comprise particles with a primary particle size of about 100 nm, about 250 nm, about 500 nm, about 1 μm, about 2 μm, about 4 μm, about 6 μm, about 8 μm, or about 10 μm, or any range of values therebetween. In some embodiments, the silicon active material is commercial material used without further treatment.

In some embodiments, the anode electrode film comprises or comprises about 1%, about 2%, about 3%, about 5%, about 7.5%, about 10%, about 15%, about 20%, about 25%, about 30%, about 40%, or about 50% silicon by mass, or any range of values therebetween. In further embodiments, the anode electrode film or anode electrode film mixture comprises or comprises about 1 to 30 wt % silicon, or 10 to 30 wt % silicon. In still further embodiments, the anode electrode film or anode electrode film mixture comprises or comprises about 1 to 5 wt % silicon, or 5 to 15 wt % silicon. In some embodiments, the anode electrode film comprises or comprises about 1%, about 2%, about 3%, about 5%, about 7.5%, about 10%, about 15%, about 20%, about 25%, about 30%, about 40%, or about 50% of a Group 14 active material by mass, or any range of values therebetween. In further embodiments, the anode electrode film or anode electrode film mixture comprises or comprises about 1 to 30 wt % of a Group 14 active material, or 10 to 30 wt % Group 14 active material. In still further embodiments, the anode electrode film or anode electrode film mixture comprises or comprises about 1 to 5 wt % of a Group 14 active material, or 5 to 15 wt % of a Group 14 active material. In general, an anode electrode film including a Group 14 active material, such as a silicon active material, in a stated amount (such as a percentage) comprises the Group 14 active material in the stated amount, with the balance of the active material being graphite. Unless stated otherwise, the percent mass of Group 14 active material is relative to the total mass of the electrode film including active materials, binders, and any other additives.

The anode active materials, including the silicon active material and graphite(s) can be classified as, for example, an insertion material (such as carbon, graphite, and/or graphene), an alloying/dealloying material (such as silicon, silicon oxide (SiOx), aluminum, tin, and/or tin oxide (SnOx)), a metal alloy or compound (such as Si—Al, and/or Si—Sn), and/or a conversion material (such as a transition metal oxide, for example, manganese oxide (MnOx), molybdenum oxide (MoO2), nickel oxide (NiOx), and/or copper oxide (CuOx)). The anode active materials can be used alone or mixed together to form multi-phase materials (such as, for example, Si—C, Sn—C, SiOx-C, SnOx-C, Si—Sn, Si—SiOx, Sn—SnOx, Si—SiOx-C, Sn—SnOx-C, Si—Sn—C, SiOx-SnOx-C, Si—SiOx-Sn, or Sn—SiOx-SnOx.). The silicon active material may comprise nanoparticles. In some embodiments, the anode active material includes a single Group 14 active material. In further embodiments, the anode active material includes a single Group 14 element. In yet further embodiments, the anode active material includes a plurality of Group 14 elements. In still further embodiments, the anode active material includes silicon and tin.

The anode active material may include various combinations of silicon and graphite active materials as indicated in Table 1, Table 2, and Table 3. The ratio between the primary graphite(s), secondary graphite(s), and silicon active material can be varied as shown in each example formula of Table 1, Table 2, and Table 3.

TABLE 1

Contemplated composite dry anode electrode films including a silicon active material, a primary graphite (PG) and a secondary graphite (SG) (Si/PG/SG)

| | PG | | | | | |
| --- | --- | --- | --- | --- | --- | --- |
| | AG I | AG II | NG I | NG II | SG | Si |
| Formula 1 | X | | | | X | X |
| Formula 2 | | X | | | X | X |
| Formula 3 | | | X | | X | X |
| Formula 4 | | | | X | X | X |

TABLE 2

Contemplated composite dry anode electrode films including a silicon active material, a first primary graphite (PG1), a second primary graphite (PG2), and a secondary graphite (SG) (Si/PG1/PG2/SG), where PG1 and PG2 can be a synthetic graphite (AG) or a natural graphite (NG)

|  | PG1 | | PG2 | | | |
|---|---|---|---|---|---|---|
|  | AG I | AG II | NG I | NG II | SG | Si |
| Formula 5 | X |  | X |  | X | X |
| Formula 6 |  | X | X |  | X | X |
| Formula 7 | X |  |  | X | X | X |
| Formula 8 |  | X |  | X | X | X |
| Formula 9 | X |  |  | X | X | X |

TABLE 3

Contemplated composite dry anode electrode films including a silicon active material, a primary graphite (PG1), a first secondary graphite (SG1), and a second secondary graphite (SG2) (Si/PG/SG1/SG2)

|  | PG | | SG | | |
|---|---|---|---|---|---|
|  | AG | NG | SG1 | SG2 | Si |
| Formula 10 | X |  | X | X | X |
| Formula 11 |  | X | X | X | X |

An anode electrode film described herein may have a film thickness of at least 50 μm, for example, about 50 μm, about 100 μm, about 150 μm, about 200 μm, about 225 μm, about 250 μm, about 275 μm, about 300 μm, or about 400 μm, or any range of values therebetween.

An anode electrode film described herein may have an active material loading (which may be expressed as mass per unit area of electrode film or current collector) of at least about 10 mg/cm$^2$, for example, about 10 mg/cm$^2$, about 15 mg/cm$^2$, about 20 mg/cm$^2$, about 25 mg/cm$^2$, about 30 mg/cm$^2$, about 35 mg/cm$^2$, about 40 mg/cm$^2$, or any range of values therebetween.

In some embodiments, a silicon-containing anode electrode film may provide Coulombic efficiency of about 75%, about 78%, about 80%, about 82%, about 84%, about 86%, about 88%, about 90%, about 92%, about 94%, or any range of values therebetween.

In some embodiments, a silicon-containing anode electrode film may provide energy density (which may be expressed as energy per mass of electrode film) of about 1000 Wh/kg, about 1200 Wh/kg, about 1400 Wh/kg, about 1600 Wh/kg, about 1800 Wh/kg, about 2000 Wh/kg, or any range of values therebetween.

In some embodiments, a silicon-containing anode electrode film may provide specific energy storage (which may be expressed as energy per unit volume of the final or in situ electrode film) of about 2000 Wh/L, about 3000 Wh/L, about 4000 Wh/L, about 5000 Wh/L, or any range of values therebetween.

In some embodiments, a silicon-containing anode electrode film may provide specific capacity on charge or discharge of about 400 mAh/g, about 500 mAh/g, about 600 mAh/g, about 700 mAh/g, about 800 mAh/g, about 1000 mAh/g, about 1500 mAh/g, about 2000 mAh/g, about 3000 mAh/g or any range of values therebetween.

In some embodiments, a silicon-containing anode electrode film may provide a measured specific capacity of at least 95% percent of its theoretical capacity, for example, about 95%, about 96%, about 97%, about 98%, about 99%, about 99.9%, or any range of values therebetween.

The one or more binders can include polytetrafluoroethylene (PTFE), a polyolefin, polyalkylenes, polyethers, styrene-butadiene rubber (SBR), co-polymers of polysiloxanes and polysiloxane, branched polyethers, polyvinylethers, polyacrylic acid, polyvinylcarbonate, co-polymers thereof, and/or admixtures thereof. The one or more binders can further include guar, alginic acid, poly[(isobutylene-alt-maleic acid, ammonium salt)-co-isobutylene-alt-maleic anhydride)], poly(ethylene-alt-maleic anhydride), poly(methyl vinyl ether-alt-maleic anhydride), polyacrylonitrile (PAN), poly(methyl methacrylate) (PMMA), poly(vinyl chloride) (PVC), and polyvinyl ether. The binder can include a cellulose. In some embodiments, the polyolefin can include polyethylene (PE), polypropylene (PP), polyvinylidene fluoride (PVDF), co-polymers thereof, and/or mixtures thereof. For example, the binder can include polyvinylene chloride, poly(phenylene oxide) (PPO), polyethylene-block-poly(ethylene glycol), poly(ethylene oxide) (PEO), poly(phenylene oxide) (PPO), polyethylene-block-poly(ethylene glycol), polydimethylsiloxane (PDMS), polydimethylsiloxane-coalkylmethylsiloxane, co-polymers thereof, and/or admixtures thereof. In certain embodiments, the fibrillizable binder is PTFE. A dry self-supporting electrode film may comprise interpenetrating networks of the aforementioned binders.

The binder may comprise a cellulose or a derivative of cellulose. A derivative of cellulose can include, for example, cellulose esters such as cellulose acetate; cellulose ethers such as methylcellulose, ethylcellulose, hydroxylpropylcellulose (HPC), hydroxylpropylmethylcellulose, or hydroxyethylcellulose (HEC); cellulose nitrate; a cellulose chitosan, for example, carboxymethylcellulose chitosan; or a carboxyalkylcellulose, for example, carboxymethylcellulose (CMC), carboxyethylcellulose, carboxypropylcellulose, or carboxyisopropylcellulose. In further embodiments, the cellulose or cellulose derivative may comprise a cellulose salt. In still further embodiments, a cellulose salt cation may be selected from sodium, ammonium, calcium, or lithium. For example, the cellulose or cellulose derivative may comprise a sodium cellulose or a sodium cellulose derivative selected from a sodium cellulose ester, sodium cellulose ether, a sodium cellulose nitrate, or a sodium carboxyalkylcellulose. The CMC may comprise sodium carboxymethylcellulose. In some embodiments, the one or more binders comprise CMC, PVDF, and/or PTFE.

In some embodiments, a silicon-containing anode electrode film as provided herein includes selected graphite material for a such a film. In some embodiments, a silicon-containing anode electrode film as provided herein provides a formulation including graphite to enable dry electrode processing. In further embodiments, the anode electrode film is a free standing film. In some embodiments, a silicon-containing anode electrode film as provided herein includes a silicon mass loading of greater than 10 wt %. In some embodiments, a silicon-containing anode electrode film as provided herein includes a non-aqueous carbonate-based electrolyte composition for improved performance.

An electrode film described herein, or an energy storage device incorporating an electrode film described herein, may advantageously be characterized by improved specific capacity (which may be measured in mAh/g). Further improvements that may be realized in various embodiments include reduced capacity fade over the life of the device compared to a typical silicon-containing electrode film.

A free-standing anode electrode film described herein may have an improved peak tensile strength (which may be measured in newtons (N) from a film having a width of 20 millimeters). In some embodiments, the peak tensile strength of an anode electrode film is at least about 2 N, for example, about 2 N, about 2.5 N, about 3 N, about 3.5 N, about 4 N, or any range of values therebetween.

Some embodiments relate to dry electrode processing techniques. Dry electrode fabrication processes may be as disclosed in one or more of U.S. Publication No. 2006/0114643, U.S. Publication No. 2006/0133013, U.S. Pat. No. 9,525,168, or U.S. Pat. No. 7,935,155, each of which is incorporated by reference herein in the entirety.

Figure 2:
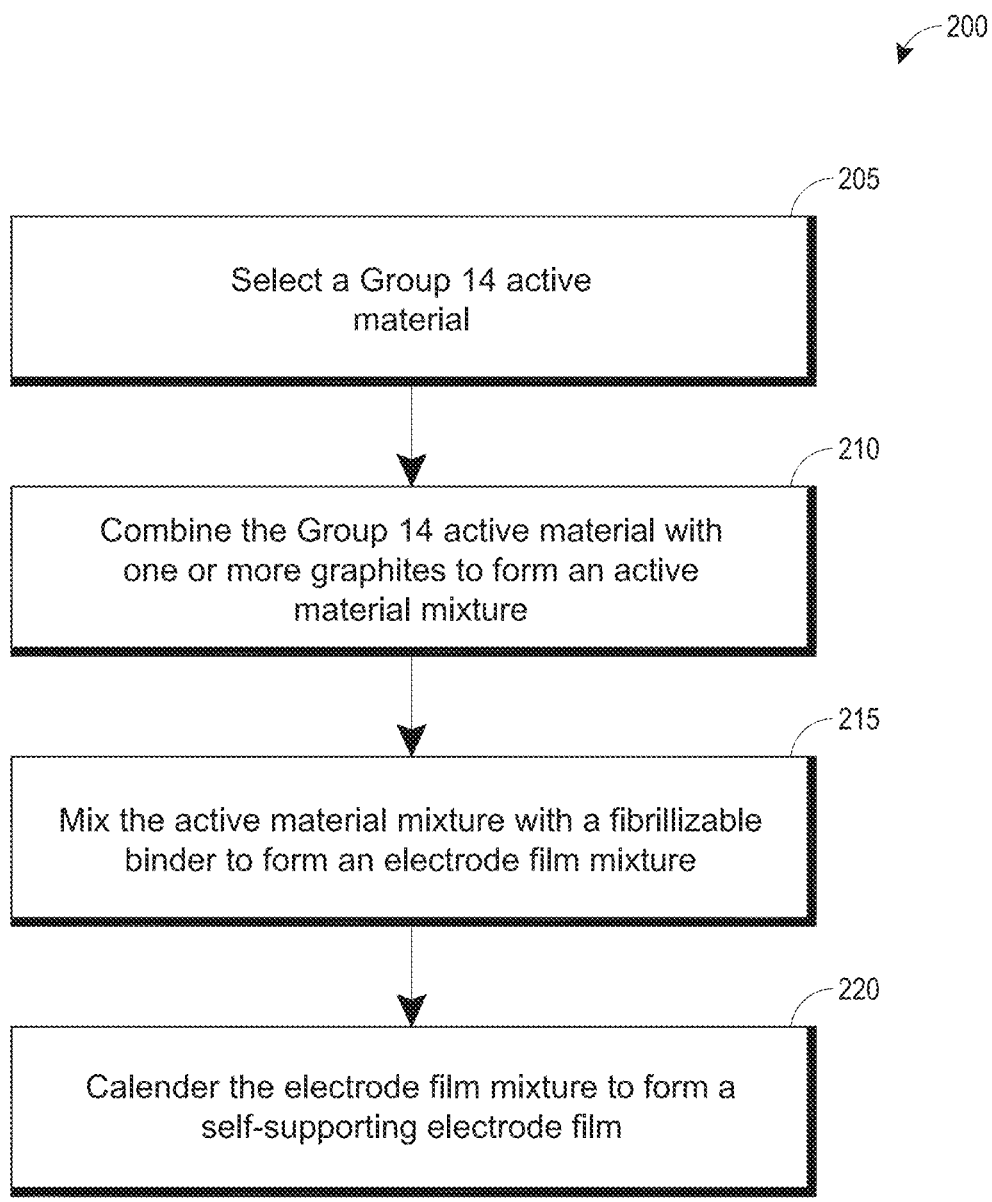
FIG. 2 provides a method for fabricating a self-supporting anode electrode film including a Group 14 active material and one or more graphite materials.

In some embodiments, a method of fabricating a free-standing electrode film is provided. With reference to FIG. 2, the method 200 may include selecting a Group 14 active material (205); combining (e.g., mixing) the Group 14 active material with one or more graphite materials, such as a primary and a secondary graphite material, to form an active material mixture (210); mixing the active material mixture with a binder to form an electrode film mixture (215); and calendering the electrode film mixture to form a self-supporting and/or free-standing electrode film (220). Step 210 may comprise blending or milling the Group 14 active material and graphite to disperse particles. In some embodiments, each step is dry and solvent-free. In further embodiments, the Group 14 active material is a silicon active material. In still further embodiments, the binder is a fibrillizable binder, such as PTFE. Some embodiments can include a premixing step prior to Step 210, which includes premixing the dry Group 14 active material with a dry binder. The dry binder used in such a premixing step can be the same or different material as the binder used in Step 215.

In various embodiments, a dry powder, for example, a mixture including binder particles and/or active material particles, can be formed (for example, in step 210, 215, or the aforementioned premixing step, of method 200) by a mild process using, for example a convection, pneumatic or diffusion mixer as follows: a tumbler with and without mixing media (for example, glass bead, ceramic ball), a paddle mixer, a blade blender or an acoustic mixer. The mild mixing process may be nondestructive with respect to any active materials in the mixture. Without limitation, graphite particles and/or silicon active material particles may be preserved of size following the mild mixing process. In further embodiments, the powder mixing sequence and conditions can be varied to improve uniform distribution of active material, binder, and optional additive(s). Mild premixing can also enhance the structural stability of the Group 14 active material, such as silicon, during cycling of an energy storage device.

In various embodiments, the dry powder for example, a mixture including binder particles and/or active material particles, can be formed (for example, in step 210, 215, or the aforementioned premixing step, of method 200) by a high shear process, such as high shear blending or high shear jet milling. High shear premixing can enhance the contact between the Group 14 active material, such as silicon, and one or more binders. In further embodiments, the powder mixing sequence and conditions can be varied to improve uniform distribution of active material, binder, and optional additive(s).

The materials and methods provided herein can be implemented in various energy storage devices. As provided herein, an energy storage device can be a capacitor, a lithium ion capacitor (LIC), an ultracapacitor, a battery, such as a lithium ion battery, or a hybrid energy storage device combining aspects of two or more of the foregoing. In preferable embodiments, the device is a lithium ion battery.

An energy storage device as provided herein can be of any suitable configuration, for example planar, spirally wound, button shaped, or pouch. An energy storage device as provided herein can be a component of a system, for example, a power generation system, an uninterruptible power source systems (UPS), a photo voltaic power generation system, an energy recovery system for use in, for example, industrial machinery and/or transportation. An energy storage device as provided herein may be used to power various electronic device and/or motor vehicles, including hybrid electric vehicles (HEV), plug-in hybrid electric vehicles (PHEV), and/or electric vehicles (EV).

FIG. 1 shows a side cross-sectional schematic view of an example of an energy storage device 100 having electrode films including a silicon-containing anode electrode film as provided herein. The energy storage device 100 may be classified as, for example, a capacitor, a battery, a capacitor-battery hybrid, or a fuel cell. In preferable embodiments, device 100 is a lithium ion battery.

The device has a silicon-based anode 102, a cathode 104, and a separator 106 positioned between the anode 102 and cathode 104. The anode 102 and the cathode 104 are adjacent to respective opposing surfaces of the separator 106. The energy storage device 100 includes an electrolyte 118 to facilitate ionic communication between the anode 102 and cathode 104 of the energy storage device 100. The electrolyte 118, anode 102, cathode 104, and separator 106 are housed within an energy storage device housing 120.

The energy storage device housing 120 may be sealed around the first electrode 102, the second electrode 104 and the separator 106, and may be physically sealed from the surrounding environment.

The separator 106 is configured to electrically insulate the anode 102 from the cathode 104, while permitting ionic communication between the two adjacent electrodes. The separator 106 can comprise a suitable porous, electrically insulating material. In some embodiments, the separator 106 can comprise a polymeric material. For example, the separator 106 can comprise a cellulosic material (e.g., paper), a polyethylene (PE) material, a polypropylene (PP) material, and/or a polyethylene and polypropylene material.

Generally, the anode 102 and cathode 104 each comprise a current collector and an electrode film. For example, cathode 102 comprises electrode film 112 and anode 104 comprises electrode film 114, respectively. Electrode films 112 and 114 can have any suitable shape, size and thickness. For example, the electrode films can have a thickness of about 30 microns (μm) to about 250 microns, for example, about 50 microns, about 100 microns, about 150 microns, about 200 microns, about 250 microns, about 300 microns, about 400 microns, about 500 microns, about 750 microns, about 1000 microns, about 2000 microns, or values therebetween. The electrode films generally comprise one or more active materials, for example, anode active materials or cathode active materials as provided herein. The electrode films 112 and/or 114 may be dry and/or self-supporting electrode films as provided herein, and having advantageous properties, such as tensile strength, or capacity, as provided herein. The first electrode film 112 and/or the second electrode film 114 may comprise a Group 14 active material, for example, a silicon active material, as described herein. As illustrated, the first electrode film 112 comprises silicon active material particles 122 and graphite active material particles 124. The electrode films 112 and/or 114 may be prepared by a process as described herein. The electrode films 112 and/or 114 may be wet or self-supporting dry electrodes as described herein.

The first current collector 108 and the second current collector 110 facilitate electrical coupling between each corresponding electrode film and an external electrical circuit (not shown). The first current collector 108 and/or the second current collector 110 comprise one or more electrically conductive materials, and have can have any suitable shape and size selected to facilitate transfer of electrical charge between the corresponding electrode and an external circuit. For example, a current collector can include a metallic material, such as a material comprising aluminum, nickel, copper, rhenium, niobium, tantalum, and noble metals such as silver, gold, platinum, palladium, rhodium, osmium, iridium and alloys and combinations of the foregoing. For example, the first current collector 108 and/or the second current collector 110 can comprise, for example, an aluminum foil or a copper foil. The first current collector 108 and/or the second current collector 110 can have a rectangular or substantially rectangular shape sized to provide transfer of electrical charge between the corresponding electrode and an external circuit.

In some embodiments, energy storage device 100 can be a lithium ion battery. In some embodiments, the electrode film of a lithium ion battery electrode can comprise a silicon active material.

In further embodiments, the energy storage device 100 is charged with a suitable lithium-containing electrolyte. For example, device 100 can include a lithium salt, and a solvent, such as a non-aqueous or organic solvent. Generally, the lithium salt includes an anion that is redox stable. In some embodiments, the anion can be monovalent. In some embodiments, a lithium salt can be selected from hexafluorophosphate ($LiPF_6$), lithium tetrafluoroborate ($LiBF_4$), lithium perchlorate ($LiClO_4$), lithium bis(trifluoromethansulfonyl)imide ($LiN(SO_2CF_3)_2$), lithium bis(fluorosulfonyl)imide ($F_2NO_4S_2Li$), lithium trifluoromethansulfonate ($LiSO_3CF_3$), lithium bis(oxalato)borate ($LiBC_2O_4)_2$ and combinations thereof. In some embodiments, the electrolyte can include a quaternary ammonium cation and an anion selected from the group consisting of hexafluorophosphate, tetrafluoroborate and iodide. In some embodiments, the salt concentration can be about 0.1 mol/L (M) to about 5 M, about 0.2 M to about 3 M, or about 0.3 M to about 2 M. In further embodiments, the salt concentration of the electrolyte can be about 0.7 M to about 1 M. In certain embodiments, the salt concentration of the electrolyte can be about 0.2 M, about 0.3 M, about 0.4 M, about 0.5 M, about 0.6 M, about 0.7 M, about 0.8 M. about 0.9 M, about 1 M, about 1.1 M, about 1.2 M, or values therebetween.

In some embodiments, an energy storage device electrolyte as provided herein can include a liquid solvent. A solvent as provided herein need not dissolve every component, and need not completely dissolve any component, of the electrolyte. In further embodiments, the solvent can be an organic solvent. In some embodiments, a solvent can include one or more functional groups selected from carbonates, ethers and/or esters. In some embodiments, the solvent can comprise a carbonate. In further embodiments, the carbonate can be selected from cyclic carbonates such as, for example, ethylene carbonate (EC), propylene carbonate (PC), vinyl ethylene carbonate (VEC), vinylene carbonate (VC), fluoroethylene carbonate (FEC), and combinations thereof, or acyclic carbonates such as, for example, dimethyl carbonate (DMC), diethyl carbonate (DEC), ethyl methyl carbonate (EMC), and combinations thereof. In certain embodiments, the electrolyte can comprise $LiPF_6$, and one or more carbonates.

In some embodiments, the electrolyte solvent comprises ethylene carbonate (EC), ethyl methyl carbonate (EMC), dimethyl carbonate (DMC), and propylene carbonate (PC). In further embodiments, the electrolyte solvent comprises ethylene carbonate (EC) and dimethyl carbonate (DMC). In still further embodiments, the electrolyte solvent comprises ethylene carbonate (EC) and ethyl methyl carbonate (EMC). In further embodiments, the electrolyte solvent comprises ethylene carbonate (EC), ethyl methyl carbonate (EMC), and dimethyl carbonate (DMC). The electrolyte solvent may comprise an ethylmethyl carbonate-rich solvent formulation. The electrolyte may further comprise an additive. The electrolyte additive may be a carbonate, for example fluoroethylene carbonate (FEC) or diallyl pyrocarbonate (DAPC). The electrolyte additive may be cyclohexane (CH). The electrolyte solvent can comprise the additive in about 1% to about 30% by weight, for example, in about 1% to about 20% by weight or about 1% to about 10% by weight.

Table 4 provides embodiments of electrolyte formulations including a carbonate solvent, a lithium salt, and one or more additives, where the one or more additives were FEC, CH and/or DAPC. Certain embodiments provide each of Electrolytes 1-4 wherein the volume ratio of EC:EMC is about 3:7. Further embodiments provide each of Electrolytes 1-4 wherein the $LiPF_6$ salt concentration is about 1.2 M. In Table 4, the weight % of each additive is relative to the total weight of electrolyte including solvent, salt, and additive.

TABLE 4

Electrolyte formulations used in conjunction with silicon/graphite composite dry electrode half cells.

| | Solvent | Li salt | FEC | CH | DAPC |
|---|---|---|---|---|---|
| Electrolyte 1 | EC:EMC | LiPF6 | 5 wt % | 0 wt % | 0 wt % |
| Electrolyte 2 | EC:EMC | LiPF6 | 5 wt % | 2 wt % | 2 wt % |
| Electrolyte 3 | EC:EMC | LiPF6 | 10 wt % | 4 wt % | 2 wt % |
| Electrolyte 4 | EC:EMC | LiPF6 | 10 wt % | 4 wt % | 5 wt % |

The materials and methods provided herein can be implemented in various energy storage devices. As provided herein, an energy storage device can be a capacitor, a lithium ion capacitor (LIC), an ultracapacitor, a battery, or a hybrid energy storage device and/or a hybrid cell, combining aspects of two or more of the foregoing. In preferable embodiments, the device is a battery. The energy storage device can be characterized by an operating voltage. In some embodiments, an energy storage device described herein can have an operating voltage of about 0 V to about 5 V. In further embodiments, the operating voltage can be about 2.7 V to about 4.2 V, about 3.0 to about 4.2 V, or values therebetween.

In some embodiments, the lithium ion battery is configured to operate at about 2.5 to 5 V, or 3.0 to 4.2 V. In further embodiments, the lithium ion battery is configured to have a minimum operating voltage of about 2.5 V to about 3 V, respectively. In still further embodiments, the lithium ion battery is configured to have a maximum operating voltage of about 4.1 V to about 4.4 V, respectively.

In some embodiments, an electrode film as provided herein includes at least one active material and at least one binder. The at least one active material can be any active material known in the art. The at least one active material may be a material suitable for use in the anode or cathode of a battery. The cathode active material can be, for example, a metal oxide, metal sulfide, a sulfur-carbon composite, or a lithium metal oxide. The lithium metal oxide can be, for example, a lithium nickel manganese cobalt oxide (NMC), a lithium manganese oxide (LMO), a lithium iron phosphate (LFP), a lithium cobalt oxide (LCO), a lithium titanate (LTO), lithium nickel manganese oxide (LNMO) and/or a lithium nickel cobalt aluminum oxide (NCA). In some embodiments, cathode active materials can be comprised of, for example, a layered transition metal oxide (such as LiCoO2 (LCO), Li(NiMnCo)O2 (NMC) and/or LiNi0.8Co0.15Al0.05O2 (NCA)), a spinel manganese oxide (such as LiMn2O4 (LMO) and/or LiMn1.5Ni0.5O4 (LMNO)) or an olivine (such as LiFePO4). The cathode active material can comprise sulfur or a material including sulfur, such as lithium sulfide (Li2S), or other sulfur-based materials, or a mixture thereof. In some embodiments, the cathode film comprises a sulfur or a material including sulfur active material at a concentration of at least 50 wt %. In some embodiments, the cathode film comprising a sulfur or a material including sulfur active material has an area-normalized specific capacity (i.e., areal capacity) of at least 10 mAh/cm2. In some embodiments, the cathode film comprising a sulfur or a material including sulfur active material has an electrode film density of 1 g/cm3. In some embodiments, the cathode film comprising a sulfur or a material including sulfur active material further comprises a binder.

The at least one active material may include one or more carbon materials. The carbon materials may be selected from, for example, graphitic material, graphite, graphene-containing materials, hard carbon, soft carbon, carbon nanotubes, porous carbon, conductive carbon, or a combination thereof. A graphite can be synthetic or naturally derived. Activated carbon can be derived from a steam process or an acid/etching process. In some embodiments, the graphitic material can be a surface treated material. In some embodiments, the porous carbon can comprise activated carbon. In some embodiments, the porous carbon can comprise hierarchically structured carbon. In some embodiments, the porous carbon can include structured carbon nanotubes, structured carbon nanowires and/or structured carbon nanosheets. In some embodiments, the porous carbon can include graphene sheets. In some embodiments, the porous carbon can be a surface treated carbon.

In some embodiments, a cathode electrode film of a lithium ion battery or hybrid energy storage device can include about 70 weight % to about 98 weight % of the at least one active material, including about 70 weight % to about 92 weight %, or about 70 weight % to about 96 weight %. In some embodiments, the cathode electrode film can comprise up to about 10 weight % of the porous carbon material, including up to about 5 weight %, or about 1 weight % to about 5 weight %. In some embodiments, the cathode electrode film comprises up to about 5 weight %, including about 1 weight % to about 3 weight %, of the conductive additive. In some embodiments, the cathode electrode film comprises up to about 20 weight % of binder, for example, about 1.5 weight % to 10 weight %, about 4 weight % to 10 weight %, about 1.5 weight % to 5 weight %, or about 1.5 weight % to 3 weight %. In some embodiments, the cathode electrode film comprises about 1.5 weight % to about 3 weight % binder.

In some embodiments, an anode electrode film may comprise at least one active material, a binder, and optionally a conductive additive. In some embodiments, the conductive additive may comprise a conductive carbon additive, such as carbon black. In some embodiments, the at least one active material of the anode may comprise synthetic graphite, natural graphite, hard carbon, soft carbon, graphene, mesoporous carbon, silicon, silicon oxides, tin, tin oxides, germanium, lithium titanate, mixtures, or composites of the aforementioned materials. In some embodiments, an anode electrode film can include about 80 weight % to about 98 weight % of the at least one active material, including about 80 weight % to about 98 weight %, or about 94 weight % to about 97 weight %. In some embodiments, the anode electrode film comprises up to about 5 weight %, including about 1 weight % to about 3 weight %, of the conductive additive. In some embodiments, the anode electrode film comprises up to about 20 weight % of the binder, including about 1.5 weight % to 10 weight %, about 4 weight % to 10 weight %, about 1.5 weight % to 5 weight %, or about 3 weight % to 5 weight %. In some embodiments, the anode electrode film comprises about 4 weight % binder. In some embodiments, the anode film may not include a conductive additive.

The one or more binders can include polytetrafluoroethylene (PTFE), a polyolefin, polyalkylenes, polyethers, styrene-butadiene, co-polymers of polysiloxanes and polysiloxane, branched polyethers, polyvinylethers, polyacrylic acid, co-polymers thereof, and/or admixtures thereof. The binder can include a cellulose. In some embodiments, the polyolefin can include polyethylene (PE), polypropylene (PP), polyvinylidene fluoride (PVDF), co-polymers thereof, and/or mixtures thereof. For example, the binder can include polyvinylene chloride, poly(phenylene oxide) (PPO), polyethylene-block-poly(ethylene glycol), poly(ethylene oxide) (PEO), poly(phenylene oxide) (PPO), polyethylene-block-poly(ethylene glycol), polydimethylsiloxane (PDMS), polydimethylsiloxane-coalkylmethylsiloxane, co-polymers thereof, and/or admixtures thereof. In certain embodiments, the fibrillizable binder is PTFE. A dry self-supporting electrode film may comprise interpenetrating networks of the aforementioned binders.

A binder may comprise a cellulose or a derivative of cellulose. A derivative of cellulose can include, for example, cellulose esters such as cellulose acetate; cellulose ethers such as methylcellulose, ethylcellulose, hydroxylpropylcellulose (HIPC), or hydroxyethylcellulose (HEC); cellulose nitrate; or a carboxyalkylcellulose, for example, carboxymethylcellulose (CMC), carboxyethylcellulose, carboxypropylcellulose, or carboxyisopropylcellulose. In further embodiments, the cellulose or cellulose derivative may comprise a cellulose salt. In still further embodiments, a cellulose salt cation may be selected from sodium, ammonium, or lithium. For example, the cellulose or cellulose derivative may comprise a sodium cellulose or a sodium cellulose derivative selected from a sodium cellulose ester, sodium cellulose ether, a sodium cellulose nitrate, or a sodium carboxyalkylcellulose. The CMC may comprise sodium carboxymethylcellulose. In some embodiments, the one or more binders comprise CMC, PVDF, and/or PTFE.

The electrode film mixture may include binder particles, for example, PTFE binder particles, having selected sizes. In some embodiments, the binder particles may be about 50 nm, about 100 nm, about 150 nm, about 200 nm, about 250 nm, about 300 nm, about 350 nm, about 400 nm, about 450 nm, about 500 nm, about 1 μm, about 2 μm, about 3 μm, about 4 μm, about 5 μm, about 10 μm, about 50 μm, about 100 μm, or values therebetween.

A dry fabrication process can refer to a process in which no or substantially no solvents are used in the formation of an electrode film. For example, components of the electrode film, including active materials and binders, may comprise dry particles. The dry particles for forming the electrode film may be combined to provide a dry particle electrode film mixture. In some embodiments, the electrode film may be formed from the dry particle electrode film mixture such that weight percentages of the components of the electrode film and weight percentages of the components of the dry particles electrode film mixture are substantially the same. In some embodiments, the electrode film formed from the dry particle electrode film mixture using the dry fabrication process may be free from, or substantially free from, any processing additives such as solvents and solvent residues resulting therefrom. In some embodiments, the resulting electrode films are self-supporting films formed using the dry process from the dry particle mixture. In some embodiments, the resulting electrode films are free-standing films formed using the dry process from the dry particle electrode film mixture. A process for forming an active layer or electrode film can include fibrillizing the fibrillizable binder component(s) such that the film comprises a fibrillized binder matrix. In further embodiments, a free-standing electrode film may be formed in the absence of a current collector. In still further embodiments, an electrode film may comprise a fibrillized polymer matrix such that the film is self-supporting. It is thought that a matrix, lattice, or web of fibrils can be formed to provide mechanical structure to the electrode film.

An electrode film may have a selected thickness suitable for certain applications. The thickness of an electrode film as provided herein may be greater than that of an electrode film prepared by conventional processes. In some embodiments, the electrode film can have a thickness of about 250 microns, about 300 microns, about 350 microns, about 400 microns, about 450 microns, about 500 microns, about 750 microns, about 1 mm, or about 2 mm, or any range of values therebetween. In some embodiments, the electrode film thickness can be varied to correspond to a selected volumetric energy density.

In specific examples below, anode electrode films were fabricated and tested.

EXAMPLES

Composite dry electrode preparation: Silicon/graphite composite dry electrodes of the Examples were prepared by dry powder mixing of graphite and silicon along with electrode component, and calendering to form a free standing film, followed by lamination onto a current collector. The dry powder mixing was carried out in following sequence graphite/polymer binder/silicon. Specifically, dry powder mixing was carried out using a resonant acoustic mixer at 50% acceleration, as follows: primary and secondary graphite, and optionally a Group 14 active material, were mixed for 5 min, then CMC, PVDF and PTFE were added sequentially to the graphite mixture with further mixing. The dry mixed powder was processed through a micronizer jet mill at 40 psi feed and 40 psi grind pressures, then calendered at 100° C. to 185° C. to from a free standing film.

Electrochemical characterization: To perform the electrochemical measurements, single layer anode/lithium foil half cells were assembled in pouch cell configuration. The electrochemical measurements were carried out by applying constant current and/or constant potential to the anode half cells at ambient temperature.

Example 1

Figure 3:
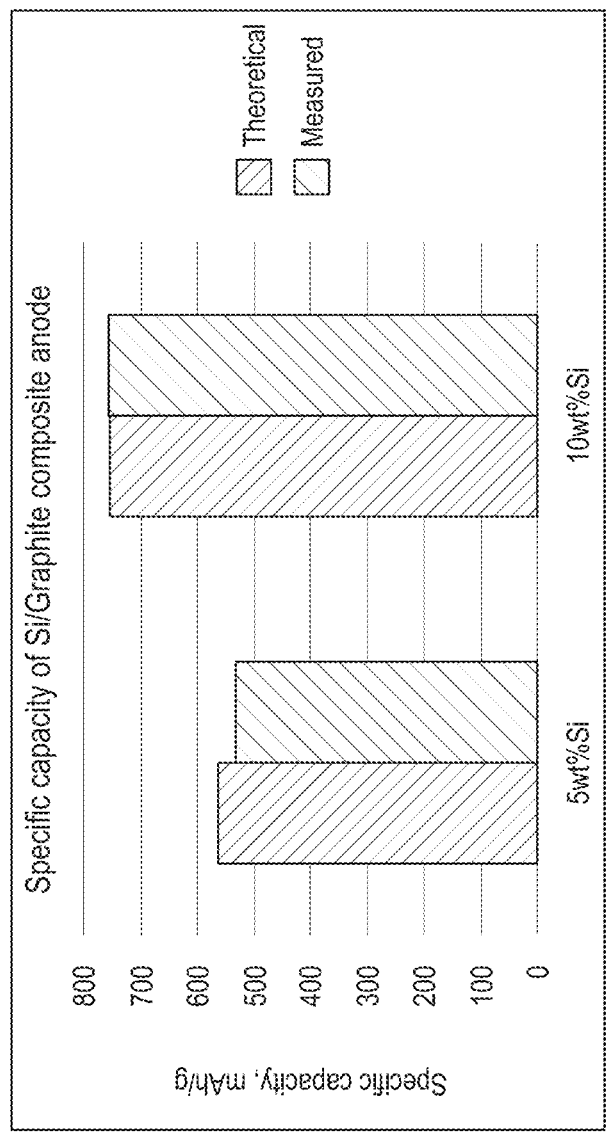
FIG. 3 provides a bar chart graphical comparison of measured electrochemical charge capacity of embodiments of embodiments of silicon/graphite composite dry anode electrode films, as compared with the calculated theoretical capacity for each film, according to Example 1.

FIG. 3 is a graph depicting the specific capacity of an example silicon and graphite composite anode electrode film, compared to the theoretical specific capacity of the film. The theoretical specific capacity was determined by assuming a capacity of 370 mAh/g for graphite and 4200 mAh/g for Si.

Example 2

Figure 4A:
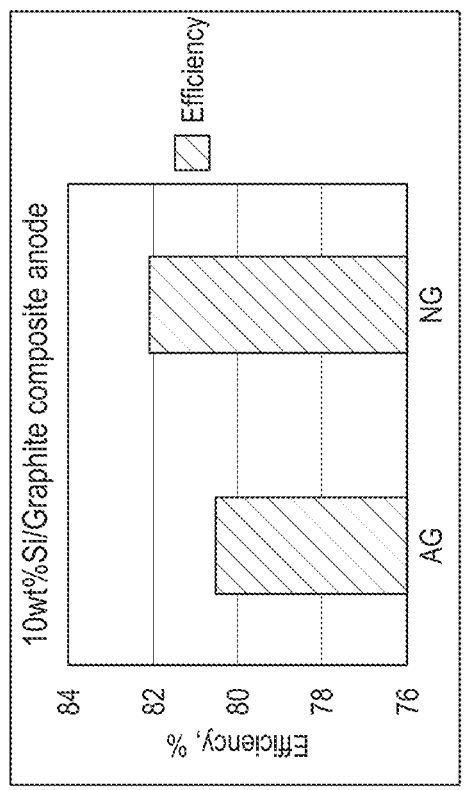
FIG. 4A provides a bar chart showing electrochemical charge and discharge capacities, FIG. 4B provides a bar chart showing columbic efficiencies and FIG. 4C provides a bar chart showing energy densities of embodiments of surface modified artificial graphite/10 wt % Si ("AG") and natural graphite/10 wt % Si ("NG") composite anode electrode half cells, according to Example 2.
Figure 4B:
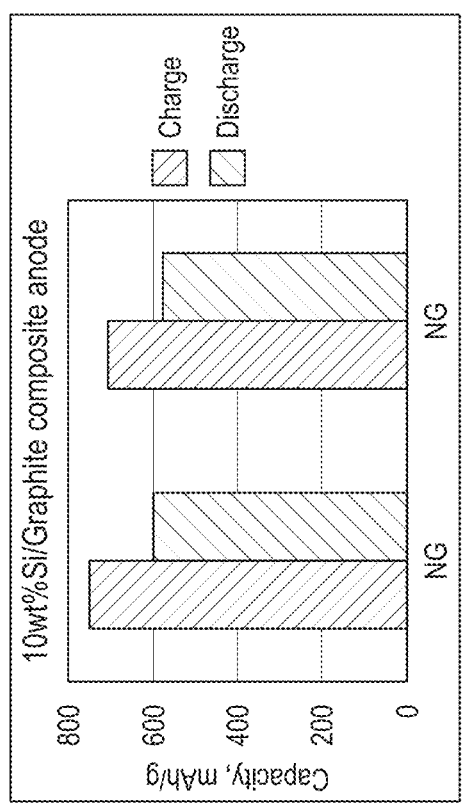
Figure 4C:
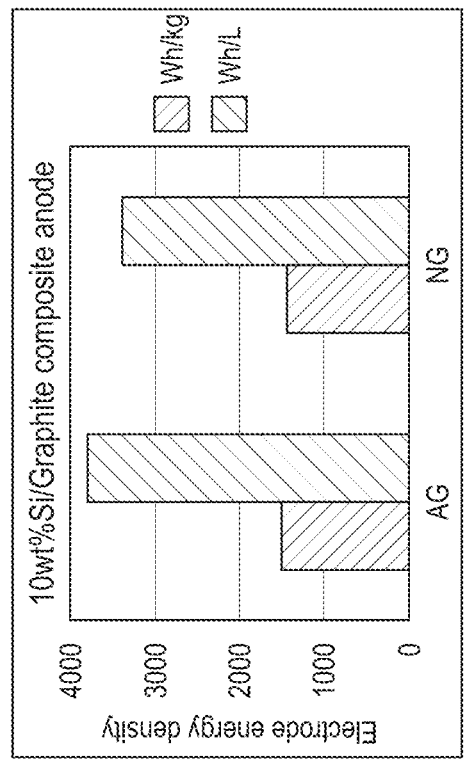

In the embodiment of FIGS. 4A-4C, commercially available artificial (AG) and natural graphite (NG) were used to fabricate silicon/graphite composite electrodes prepared by a dry fabrication process. Surprisingly, in the embodiment of FIGS. 4A-4C, artificial graphite provided higher electrochemical capacity than natural graphite in a silicon/graphite composite half cell, along with slightly lower Coulombic efficiency than natural graphite in a half cell configuration. The more uniform distribution of silicon powder and interconnection between artificial graphite powder and silicon nanoparticles may play a role. In the embodiment of FIGS. 4A-4C, natural graphite provided higher Coulombic efficiency than artificial graphite. FIG. 4A provides electrochemical capacity, FIG. 4B provides columbic efficiency and FIG. 4C provides energy density of surface modified artificial graphite/10 wt % Si ("AG") and natural graphite/10 wt % Si ("NG") composite anode electrode half cells. Active material loading was as follows: AG: 23.5 mg/cm$^2$, NG: 25 mg/cm$^2$.

Example 3

Figure 5A:
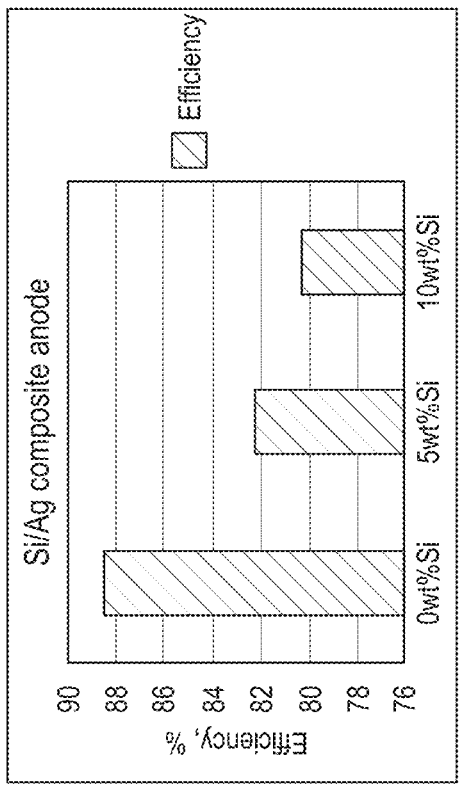
FIGS. 5A-5C provide bar charts showing electrochemical charge and discharge capacities (FIG. 5A), coulombic efficiencies (FIG. 5B), and electrode energy densities (FIG. 5C) of a graphite dry electrode ("0 wt % Si") in comparison with two embodiments of silicon/graphite dry electrodes including 5 wt % ("5 wt % Si") and 10 wt % silicon ("10 wt % Si"), respectively, according to Example 3.
Figure 5B:
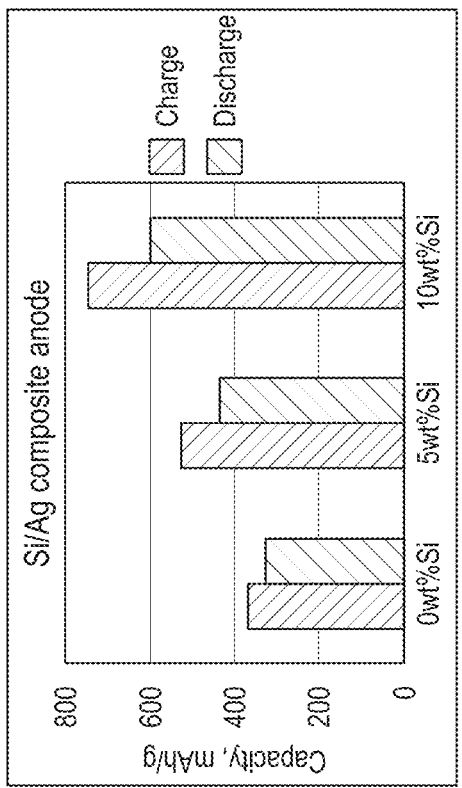
Figure 5C:
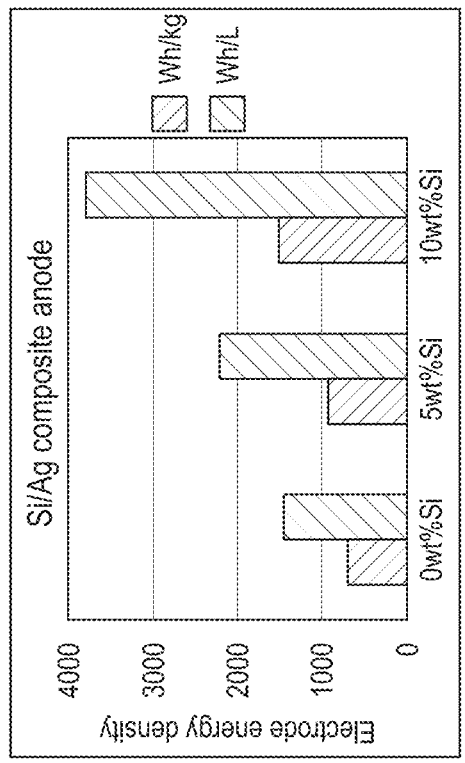

FIG. 5 provides electrochemical specific capacity and Coulombic efficiency of a graphite dry electrode ("0 wt % Si") in comparison with two embodiments of silicon/graphite dry electrodes including 5 wt % ("5 wt % Si") and 10 wt % silicon ("10 wt % Si"), respectively. Graphite in each case was artificial graphite. As expected, the silicon/graphite dry electrode with 10 wt % silicon (as Si) had the highest specific capacity and energy density. The increase in specific capacity of the 10 wt % silicon graphite composite over the 5 wt % silicon graphite composite electrode was also commensurate with the silicon content of each electrode, suggesting that the silicon active material powder was well dispersed and active under the conditions of the dry electrode processing method described herein. Active material loading was as follows: 0 wt % Si: 24.5 mg/cm$^2$, 5 wt % Si: 24.6 mg/cm$^2$, 10 wt % Si: 23.5 mg/cm$^2$.

Example 4

FIGS. 6A-6C show electrochemical performance of Si/PG/SG composite dry electrode half cells including 10 wt % silicon (Si) for embodiments according to Formulas 2, 3, and 4 of Table 1. FIG. 6A provides capacity, FIG. 6B provides efficiency, and FIG. 6C provides electrode energy density for each embodiment. The results indicate that the selection of the primary graphite impacts electrochemical capacities and Coulombic efficiency of the composite electrode. In this embodiment, natural graphite improved electrochemical performance and energy density. Active material loading was as follows: Formula 2: 22.5 mg/cm$^2$, Formula 3: 24.6 mg/cm$^2$, Formula 4: 22.5 mg/cm$^2$.

Example 5

Figure 7A:
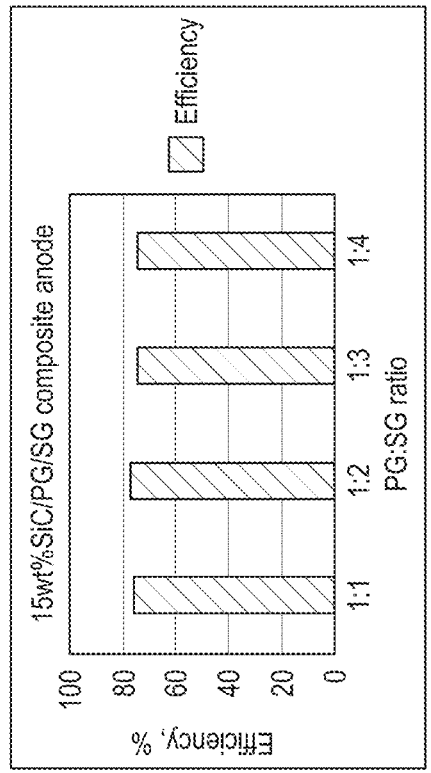
FIGS. 7A-7C provide bar and line charts showing electrochemical charge and discharge capacities (FIG. 7A), coulombic efficiencies (FIG. 7B), and electrode energy densities (FIG. 7C) of embodiments of SiC/PG/SG composite dry electrode half cells according to Formula 1 including 15 wt % silicon, and at various PG:SG mass ratios, according to Example 5.
Figure 7B:
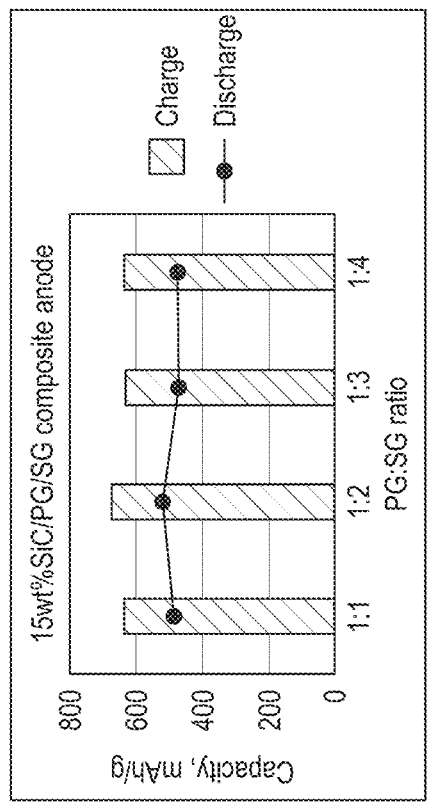
Figure 7C:
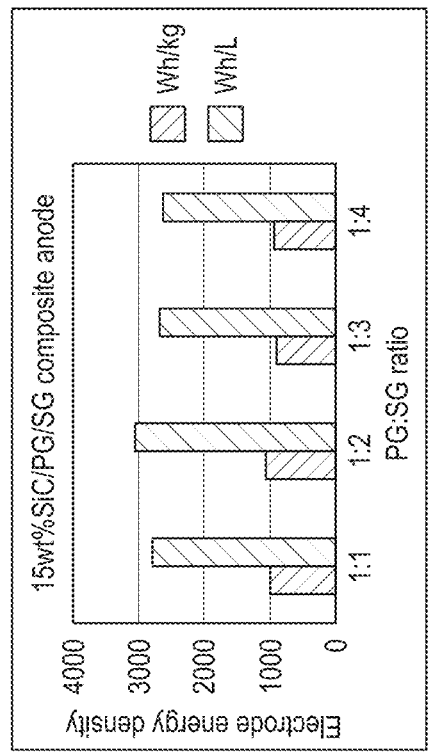

FIGS. 7A-7C show electrochemical performance of silicon/graphene (SiC) containing SiC/PG/SG composite dry electrode half cells according to Formula 1, including 15 wt % silicon active material. Electrode films were prepared at 1:1, 1:2, 1:3 and 1:4 PG:SG ratios by weight. Both the PG and SG comprised artificial graphite in each film. FIG. 7A provides capacity, FIG. 7B provides efficiency, and FIG. 7C provides electrode energy density for each embodiment. The results indicated that changes in weight ratio of PG:SG had little impact on the specific capacity and efficiency of this series of composite dry electrodes. The volumetric energy density is governed by the overall electrode thickness. As such, this thickness can be altered in the electrode production steps for better alignment in volumetric energy density. Active material loading was as follows: 1:1 film: 12.7 mg/cm$^2$, 1:2 film: 12.5 mg/cm$^2$, 1:3 film: 11 mg/cm$^2$, 1:4 film: 11.6 mg/cm$^2$.

Example 6

Figure 8A:
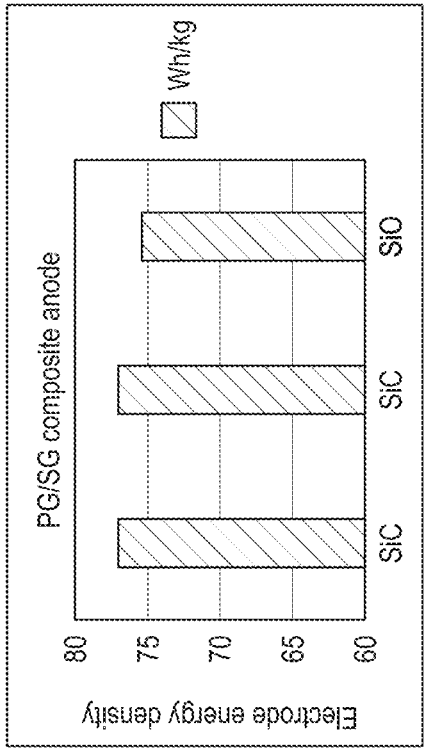
FIGS. 8A-8C provide bar and line charts showing electrochemical charge and discharge capacities (FIG. 8A), coulombic efficiencies (FIG. 8B), and electrode energy densities (FIG. 8C) of embodiments of PG(AG)/SG(AG) composite dry electrode half cells including silicon, silicon/graphene (SiC) and silicon oxide (SiO), according to Example 6.
Figure 8B:
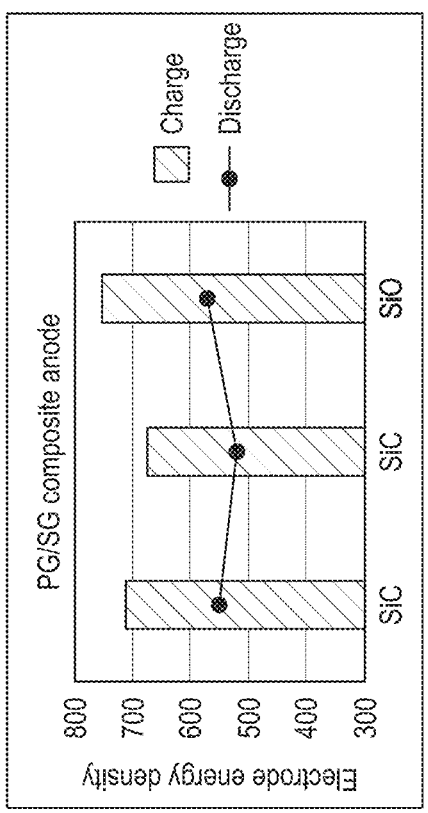
Figure 8C:
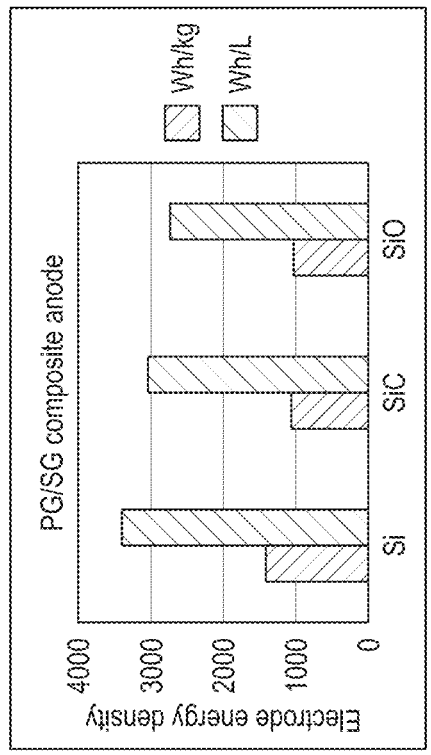

FIGS. 8A-8C show electrochemical performance of PG(AG)/SG(AG) composite dry electrode half cells including silicon ("Si"), silicon/graphene ("SiC") and silicon oxide ("SiO"), according to Formula 1. Electrode films were prepared at a 3:1 PG:SG ratio by weight. Both the PG and SG comprised artificial graphite. The Si film included 10% Si, the SiC film included 15% SiC and the SiO film included 10% SiO. FIG. 8A provides capacity, FIG. 8B provides efficiency, and FIG. 8C provides electrode energy density for each embodiment. Active material loading was as follows: Si film: 22.5 mg/cm$^2$, SiC film: 12.5 mg/cm$^2$, SiO film: 17 mg/cm$^2$.

Example 7

Figure 9:
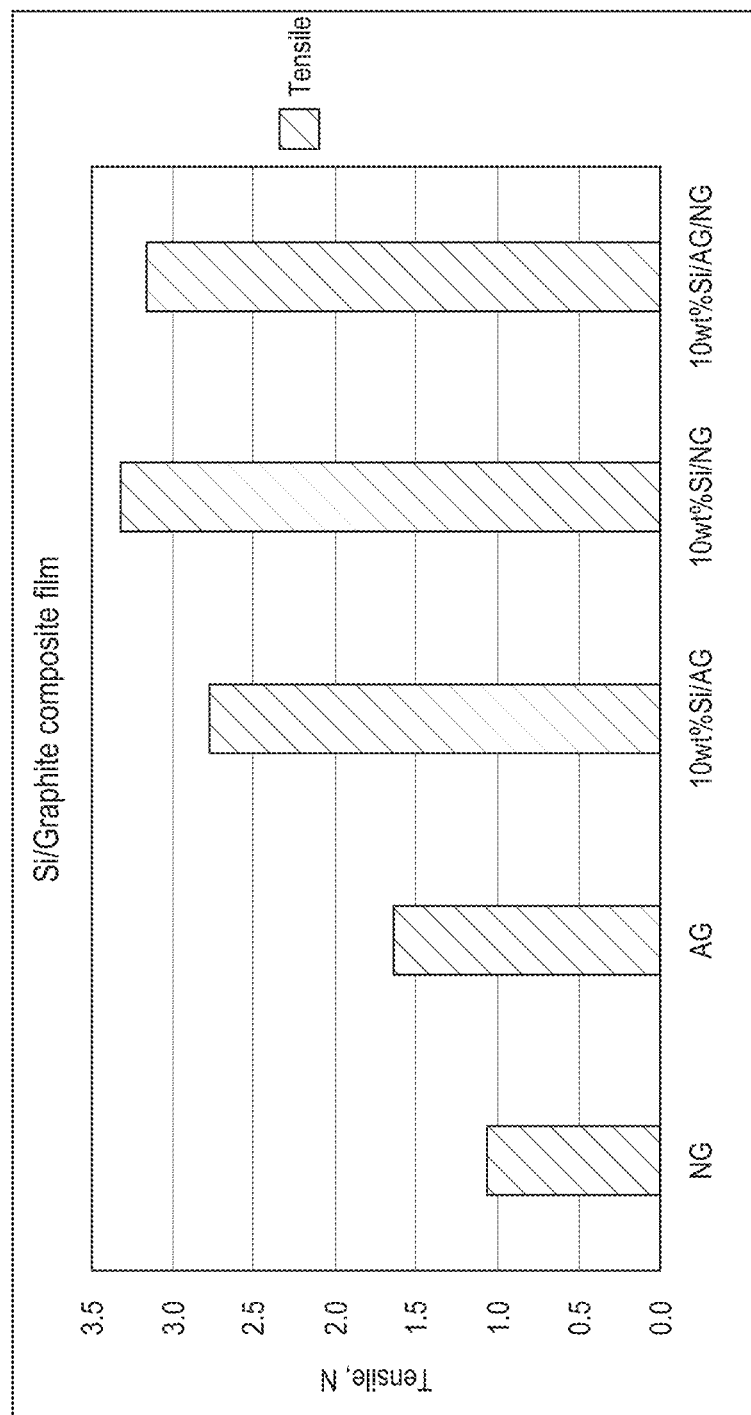
FIG. 9 provides peak tensile strength of embodiments of free standing dry electrode films including various anode active materials, according to Example 7.

FIG. 9 provides peak tensile strength of various silicon/graphite composite dry films in comparison to standard graphite dry films. The films tested were free standing dry electrode films and included various anode active materials. The films tested included a natural graphite film ("NG"), an artificial graphite film ("AG"), an artificial graphite film including 10% weight silicon (as Si) ("10 wt % Si/AG"), a natural graphite film including 10% weight silicon (as Si) ("10 wt % Si/NG"), and a film including artificial and natural graphite and 10% weight silicon (as Si) ("10 wt % Si/AG/NG"). Film thickness was as follows: NG film: 264 μm, AG film: 260 μm, 10 wt % Si/AG film: 248 μm, 10 wt % Si/NG film: 311 μm, 10 wt % Si/AG/NG film: 292 μm. The results indicated an enhancement in tensile strength of silicon/graphite composite dry films relative to simple graphite films. Furthermore, anode films including PG and SG improved the elasticity and flexibility of free standing dry silicon-containing composite films, along with the observed increased in tensile strength.

Example 8

Figure 10A:
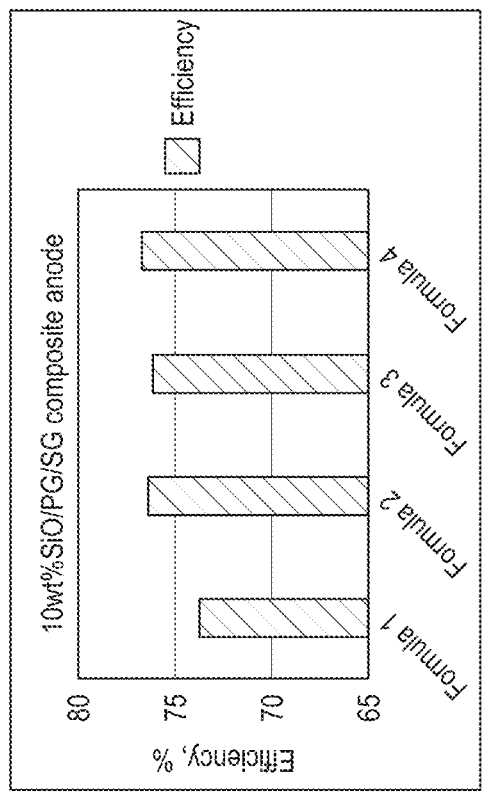
FIGS. 10A-10C provide bar and line charts showing charge and discharge capacities (FIG. 10A), coulombic efficiencies (FIG. 10B), and electrode energy densities (FIG. 10C) of four embodiments of composite dry electrode films of SiO/PG/SG including 10 wt % silicon active material, as half cells, and employing the electrolyte formulations listed in Table 4, according to Example 8.
Figure 10B:
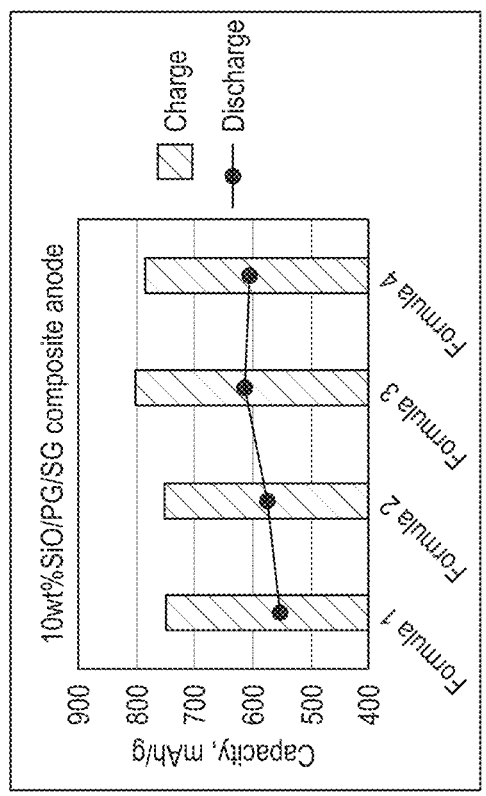
Figure 10C:
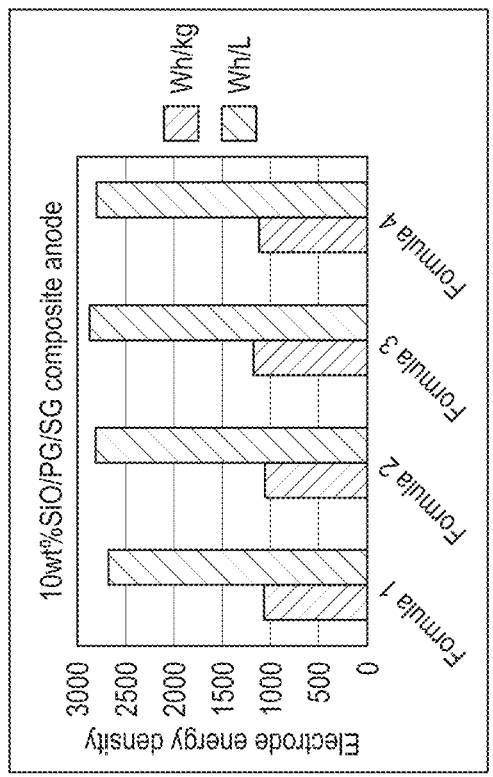

FIGS. 10A-10C provides electrochemical performance and energy density of four composite dry electrode films of SiO/PG/SG including 10 wt % silicon active material, as half cells, and employing the electrolyte formulations listed in Table 4. FIG. 10A provides capacity, FIG. 10B provides efficiency, and FIG. 10C provides electrode energy density for each embodiment. The results indicate that electrolyte composition can affect electrochemical capacity and coulombic efficiency, leading to higher energy density of silicon/graphite composite dry electrode. Active material loading was as follows: Electrolyte 1 film: 19.2 mg/cm$^2$, Electrolyte 2 film: 17.5 mg/cm$^2$, Electrolyte 3 film: 21 mg/cm$^2$, Electrolyte 4 film: 19.2 mg/cm$^2$.

Example 9

Figure 11A:
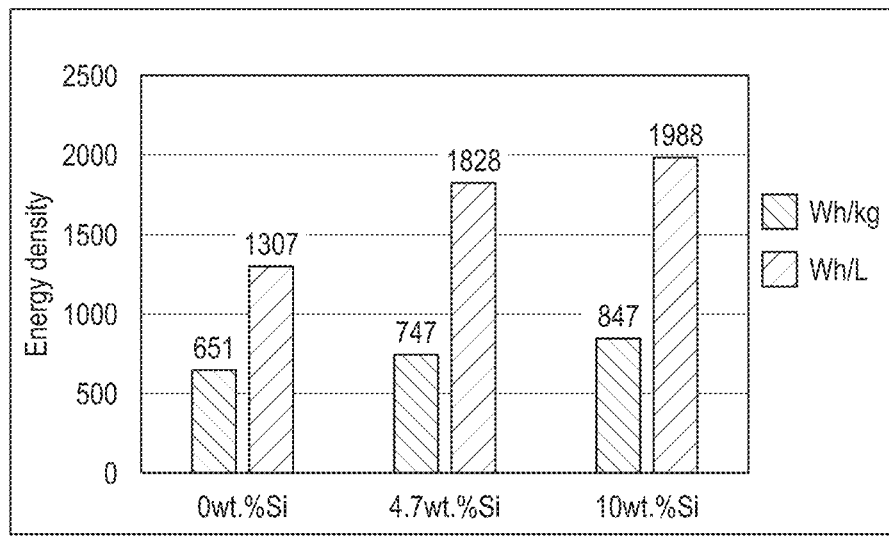
FIG. 11A and FIG. 11B provide bar charts showing energy densities (FIG. 11A) and energy density increases (FIG. 11B) for silicon-containing anode electrode films in an embodiment according to Example 9.
Figure 11B:
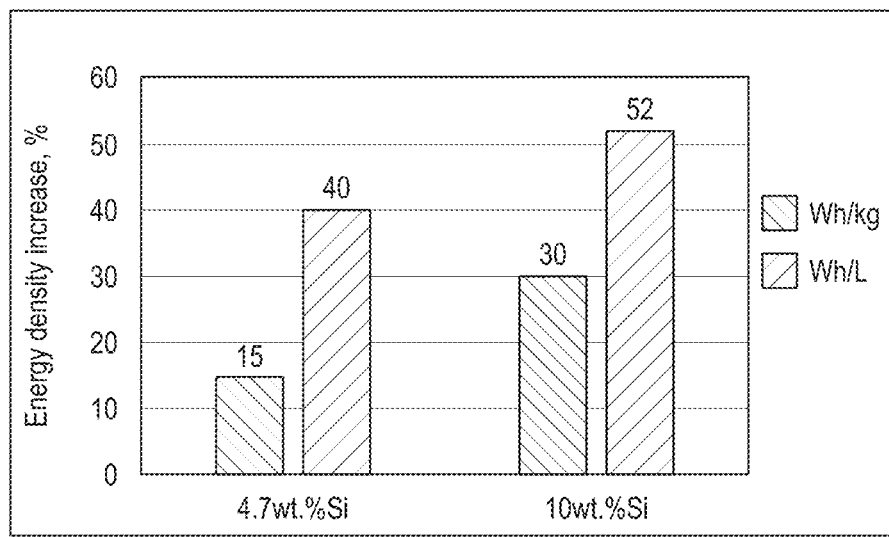

FIG. 11A and FIG. 11B provide additional performance data for silicon-containing anode electrode films. The films tested were free standing dry electrode films and included silicon anode active materials. The films tested included a typical graphite anode electrode film ("0 wt. % Si"), a 4.7 wt % silicon/graphite film ("4.7 wt. % Si") and a 10 wt % silicon/graphite film ("10 wt. % Si"). FIGS. 11A and 11B demonstrate that silicon-containing film provide an energy density over a typical graphite anode electrode film.

Example 10

Figure 12:
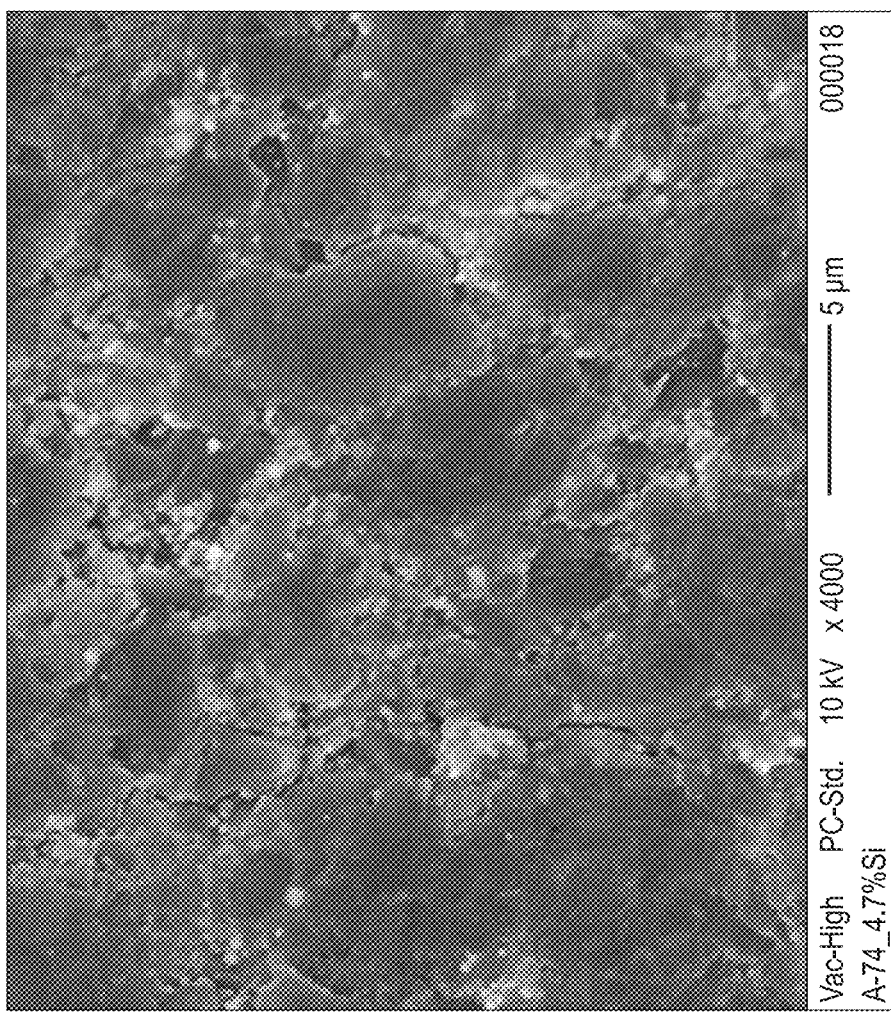
FIG. 12 provides an SEM image of the surface of a silicon-containing anode electrode film including 4.7 wt % nanoparticulate silicon in an embodiment according to Example 10.

FIG. 12 provides an SEM image of the surface of a silicon-containing anode electrode film including 4.7 wt % nanoparticulate silicon.

Example 11

Figure 13A:
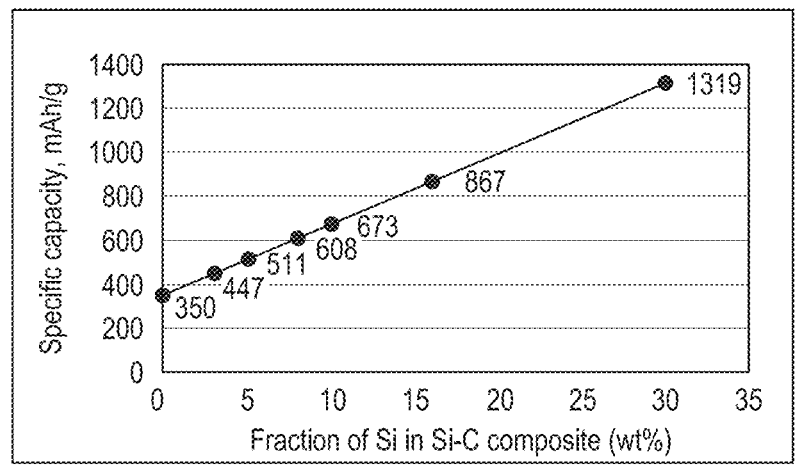
FIGS. 13A and 13B provide graphs indicating theoretical specific capacities (FIG. 13A) and specific capacity increases (FIG. 13B) for various fractions of Group 14 elements as constituents of a graphite anode film.
Figure 13B:
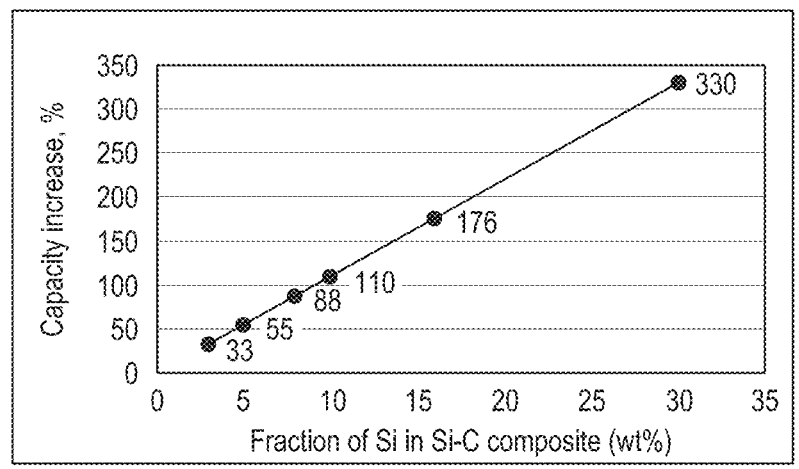

FIGS. 13A and 13B provide graphs indicating theoretical increases in capacity for various fractions of Group 14 elements as constituents of a graphite anode film. Theoretically as little as 3% silicon can increase capacity by about 33% over a typical graphite anode.

Example 12

Figure 14A:
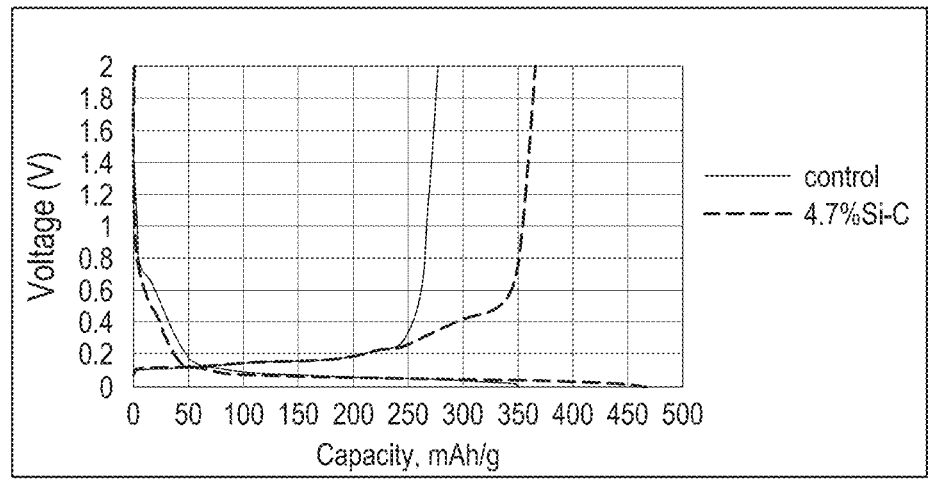
FIGS. 14A and 14B provide graphs of electrochemical charge/discharge capacity vs. voltage for silicon-containing (FIG. 14A) and tin-containing (FIG. 14B) anode electrode films compared to a control graphite film, in an embodiment according to Example 12.
Figure 14B:
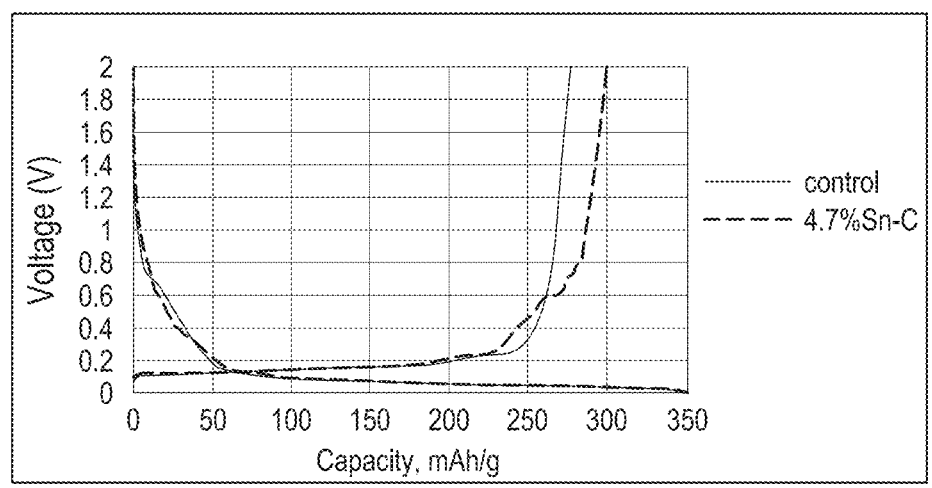

FIGS. 14A and 14B provide graphs of electrochemical charge/discharge capacity vs. voltage of silicon- and tin-containing anode electrode films, respectively, compared to a typical graphite film ("control"). The Group 14 element containing films tested included graphite along with 4.7 wt % silicon ("4.7% Si—C") or 4.7 wt % tin ("4.7% Sn—C"). Both the silicon-containing and tin-containing films demonstrated improved capacity relative to the typical graphite control film. For silicon, this increase is correlated to the extended plateau around 0.4 V to 0.5 V in the charge cycle graph seen in FIG. 14A.

Example 13

Figure 15:
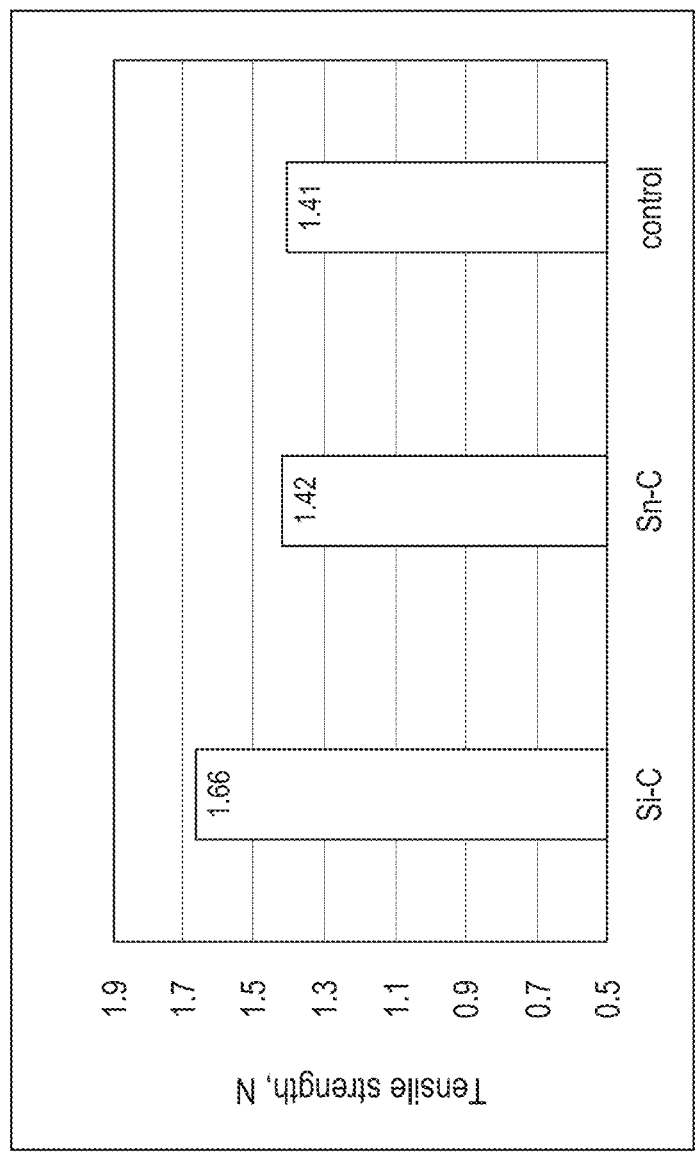
FIG. 15 provides peak tensile strength of dry free-standing anode electrode films including a Group 14 active material in comparison with a typical free-standing graphite film, in an embodiment according to Example 13.

FIG. 15 provides peak tensile strength of dry free-standing anode electrode films including a Group 14 active material in comparison with a typical free-standing graphite film ("control"). The films tested included a first graphite film including nanoparticulate silicon ("Si—C") and a second graphite film including nanoparticulate tin ("Sn—C"). The film including silicon had the highest measured tensile strength.

Example 14

Prelithiated silicon oxide graphite (SiO/C) half cells were prepared and tested. Table 5 provides Types A-C commercial prelithiated SiO/C purchased. Type C has physical property similar to Type B without surface coating, while Types A and B have surface coatings.

TABLE 5

| | Prelithiated SiO/C Types | | | | | |
|---|---|---|---|---|---|---|
| Type | Surface coating | Carbon | BET | D10 | D50 | D90 |
| A | Yes | 3.4 wt. % | 3.4 m2/g | 3.12 μm | 5.71 μm | 9.73 μm |
| B | Yes | 3.6 wt. % | 2.3 m2/g | 3.08 μm | 5.72 μm | 9.86 μm |
| C | No | 3.2 wt. % | 2.6 m2/g | 3.57 μm | 6.01 μm | 9.84 μm |

The prelithiated SiO/C types were used to make electrodes according to the formulations detailed in Table 6. Dry powder mixing was carried out following resonant acoustic mixing at 60% intensity for 5 min. The dry mixed powder underwent jet milling grinding at 40 psi feed and 40 psi grind. The final formulation was calendered at room temperature to 50° C. to form free standing film, followed by lamination onto a current collector at 185° C. All calendering and lamination processes were carried out in a dry room.

TABLE 6

Prelithiated SiO/C Electrode Formulations

| Formula | PG | SG1 | SG2 | PG:SG1:SG2 | Prelithiated SiO/C | Binder |
|---|---|---|---|---|---|---|
| 1 | AG | AG | AG | 6:3:1 by wt | Type A 10 wt % | 3 wt % CMC-0.5 wt % PEO-1 wt % PVDF-3.5 wt % PTFE |
| 2 | AG | AG | AG | 6:3:1 by wt | Type B 10 wt % | 3 wt % CMC-0.5 wt % PEO-1 wt % PVDF-3.5 wt % PTFE |
| 3 | AG | AG | AG | 6:3:1 by wt | Type C 10 wt % | 3 wt % CMC-0.5 wt % PEO-1 wt % PVDF-3.5 wt % PTFE |

Figure 16A:
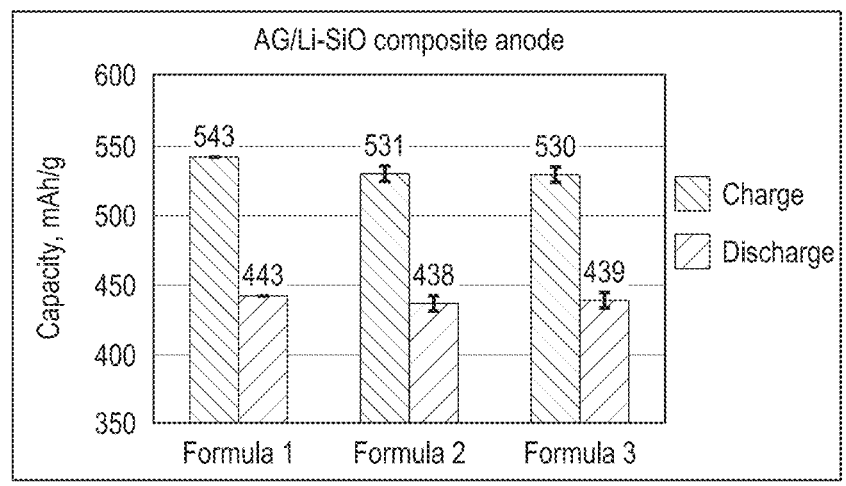
FIG. 16A provides a bar chart showing the charge and discharge capacities of prelithiated Li—SiO/C composite anodes tested at 0.05 C rate at voltage of 5 mV to 2 V.
Figure 16B:
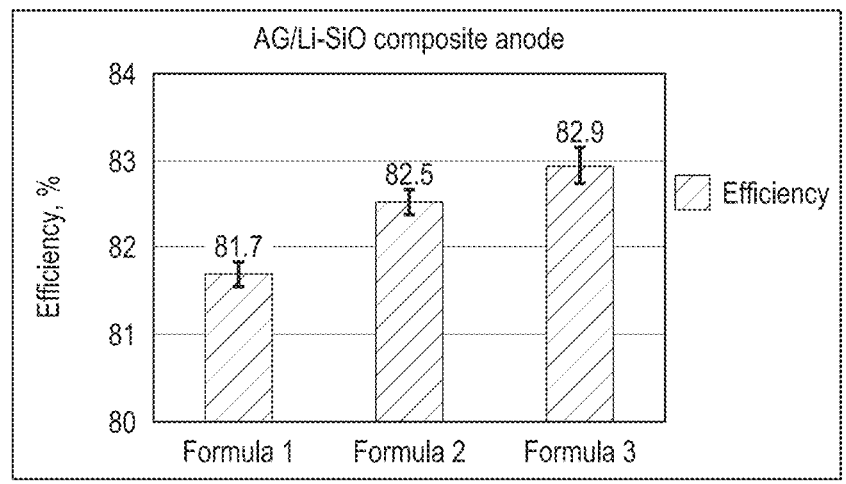
FIG. 16B provides a bar chart showing the efficiencies of prelithiated Li—SiO/C composite anodes tested at 0.05 C rate at voltage of 5 mV to 2 V, in an embodiment according to Example 14.

FIG. 16A provides a bar chart showing the charge and discharge capacities and FIG. 16B provides a bar chart showing the efficiencies of prelithiated Li—SiO/C composite anodes of Formulae 1-3 tested at 0.05 C rate at voltage of 5 mV to 2 V. The results indicate that Type B prelithiated SiO/C anode of Formula 2 delivered slightly higher efficiencies, which may be due to slightly lower surface area, and demonstrates that prelithiated SiO/C without surface coating may be processed through a dry coating process. Active material loading was as follows: Formula 1: 20.4 mg/cm$^2$, Formula 2: 18.9 mg/cm$^2$, Formula 3: 17.8 mg/cm$^2$.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products. For example, any of the components for an energy storage system described herein can be provided separately, or integrated together (e.g., packaged together, or attached together) to form an energy storage system.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree, such as the terms "approximately," "about," "generally," and "substantially" represent a value, amount, or characteristic close to the stated value, amount, or characteristic that still performs a desired function or achieves a desired result.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

EMBODIMENTS

Various example embodiments are provided below.

1. A dry electrode film of an energy storage device, comprising:
   a dry active material comprising a Group 14 active material and a graphite active material; and
   a dry binder, wherein the dry electrode film is free-standing.

2. The electrode film of Embodiment 1, wherein the dry electrode film comprises about 1 wt % to 30 wt % the Group 14 active material.

3. The electrode film of Embodiment 2, wherein the dry electrode film comprises about 10 wt % to 30 wt % the Group 14 active material.

4. The electrode film of any one of Embodiments 1-3, wherein the Group 14 active material comprises at least one of silicon and tin.

5. The electrode film of any one of Embodiments 1-4, wherein the Group 14 active material is selected from at least one of pristine silicon, silicon oxide (SiO), a silicon-carbon composite, a silicon alloy and SiH.

6. The electrode film of Embodiment 5, wherein the silicon-carbon composite is selected from at least one of silicon graphene (SiC), tin graphene, silicon graphite (Si/C), tin graphite, silicon oxide graphene (SiOC) and a silicon oxide graphite (SiO/C).

7. The electrode film of Embodiment 5, wherein the silicon alloy is selected from at least one of Si—Al and Si—Sn.

8. The electrode film of any one of Embodiments 1-7, wherein the Group 14 active material is prelithiated.

9. The electrode film of any one of Embodiments 1-8, wherein the Group 14 active material comprises particles with a $D_{50}$ primary particle size of about 1 μm to about 10 μm.

10. The electrode film of any one of Embodiments 1-9, wherein the graphite active material is selected from at least one of artificial graphite and natural graphite.

11. The electrode film of any one of Embodiments 1-10, wherein the graphite active material comprises primary graphite (PG) particles and secondary graphite (SG) particles.

12. The electrode film of Embodiment 11, wherein the PG particles have a D50 primary particle size of about 15 μm to about 30 μm.

13. The electrode film of Embodiment 11 or 12, wherein the SG particles have a D50 secondary particle size of about 2 μm to about 10 μm.

14. The electrode film of any one of Embodiments 11-13, wherein the weight ratio of PG particles to SG particles is 10:1 to 1:10.

15. The electrode film of any one of Embodiments 1-14, wherein the dry binder comprises at least one of carboxylmethylcellulose (CMC), poly(ethylene oxide) (PEO), polyacrylic acid, polyvinylidene fluoride (PVDF), and polytetrafluoroethylene (PTFE).

16. The electrode film of any one of Embodiments 1-15, wherein the dry binder comprises a dry fibrillizable binder.

17. The dry electrode film of Embodiment 16, wherein the dry fibrillizable binder comprises polytetrafluoroethylene (PTFE).

18. An electrode comprising the dry electrode film of any one of Embodiments 1-17 in contact with a current collector.

19. A lithium ion battery comprising the electrode of Embodiment 18.

20. A method of fabricating a dry electrode film of an energy storage device, comprising:
   mixing a dry Group 14 active material with a dry graphite material to form a dry active material mixture;
   mixing the dry active material mixture with a dry binder to form a dry electrode film mixture; and
   calendering the dry electrode film mixture to form a free-standing dry electrode film.

21. The method of Embodiment 20, further comprising premixing the dry Group 14 active material with a first dry binder prior to mixing the dry Group 14 active material with the dry graphite material, wherein mixing the dry active material mixture with the dry binder comprises mixing the dry active material mixture with a second dry binder.

22. The method of Embodiment 21, wherein the first dry binder and the second dry binder are different binder materials.

23. The method of any one of Embodiments 20-22, wherein at least one of the premixing step, first mixing step, and second mixing step comprises a nondestructive mixing process.

24. The method of Embodiment 23, wherein the nondestructive mixing processes comprises a resonant acoustic mixing process.

25. The method of any one of Embodiments 20-24, wherein at least one of the premixing step, first mixing step, and second mixing step comprises a high shear process.

26. The method of Embodiment 25, wherein the high shear process comprises a jet milling process.

27. The method of any one of Embodiments 20-26, wherein the dry graphite material comprises primary graphite (PG) particles and secondary graphite (SG) particles.

28. The method of Embodiment 27, wherein the PG particles have a D50 primary particle size of about 15 μm to about 30 μm.

29. The method of Embodiment 27 or 28, wherein the SG particles have a D50 secondary particle size of about 2 μm to about 10 μm.

What is claimed is:

1. A dry electrode film of an energy storage device, comprising:
    a dry active material comprising a Group 14 active material and a graphite active material; and
    a dry binder, wherein the dry electrode film is free-standing,
    wherein the graphite active material comprises primary graphite (PG) particles and secondary graphite (SG) particles distinct from the PG particles.

2. The dry electrode film of claim 1, wherein the dry electrode film comprises about 1 wt % to 30 wt % the Group 14 active material.

3. The dry electrode film of claim 1, wherein the Group 14 active material comprises at least one of silicon and tin.

4. The dry electrode film of claim 1, wherein the Group 14 active material is selected from at least one of pristine silicon, silicon oxide (SiO), a silicon-carbon composite, a silicon alloy and SiH.

5. The dry electrode film of claim 4, wherein the silicon-carbon composite is selected from at least one of silicon graphene (SiC), tin graphene, silicon graphite (Si/C), tin graphite, silicon oxide graphene (SiOC) and a silicon oxide graphite (SiO/C).

6. The dry electrode film of claim 4, wherein the silicon alloy is selected from at least one of Si—Al and Si—Sn.

7. The dry electrode film of claim 1, wherein the Group 14 active material is prelithiated.

8. The dry electrode film of claim 1, wherein the Group 14 active material comprises particles with a $D_{50}$ primary particle size of about 1 μm to about 10 μm.

9. The dry electrode film of claim 1, wherein the graphite active material is selected from at least one of artificial graphite and natural graphite.

10. The dry electrode film of claim 1, wherein the PG particles have a $D_{50}$ primary particle size of about 15 μm to about 30 μm.

11. The dry electrode film of claim 1, wherein the SG particles have a $D_{50}$ secondary particle size of about 2 μm to about 10 μm.

12. The dry electrode film of claim 1, wherein a weight ratio of the PG particles to the SG particles is 10:1 to 1:10.

13. The dry electrode film of claim 1, wherein the dry binder comprises a dry fibrillizable binder.

14. The dry electrode film of claim 13, wherein the dry fibrillizable binder comprises polytetrafluoroethylene (PTFE).

15. An electrode comprising the dry electrode film of claim 1 in contact with a current collector.

16. A lithium ion battery comprising the electrode of claim 15.

17. A method of fabricating a dry electrode film of an energy storage device, comprising:
    a first mixing step comprising mixing a dry Group 14 active material with a dry graphite material to form a dry active material mixture, the dry graphite material comprises primary graphite (PG) particles and secondary graphite (SG) particles distinct from the PG particles;
    a second mixing step comprising mixing the dry active material mixture with a dry binder to form a dry electrode film mixture; and
    calendering the dry electrode film mixture to form a free-standing dry electrode film.

18. The method of claim 17, further comprising a premixing step comprising mixing the dry Group 14 active material with a first dry binder prior to mixing the dry Group 14 active material with the dry graphite material, wherein mixing the dry active material mixture with the dry binder comprises mixing the dry active material mixture with a second dry binder.

19. The method of claim 18, wherein the first dry binder and the second dry binder are different binder materials.

20. The method of claim 18, wherein at least one of the premixing step, the first mixing step, and the second mixing step comprises a nondestructive mixing process.

21. The method of claim 20, wherein the nondestructive mixing processes comprises a resonant acoustic mixing process.

22. The method of claim 18, wherein at least one of the premixing step, the first mixing step, and the second mixing step comprises a high shear process.

23. The method of claim 22, wherein the high shear process comprises a jet milling process.

24. The dry electrode film of claim 1, wherein the PG particles have a $D_{50}$ primary particle size of about 15 μm to about 40 μm.

* * * * *